US010747265B2

(12) United States Patent
Galipeau et al.

(10) Patent No.: US 10,747,265 B2
(45) Date of Patent: Aug. 18, 2020

(54) WALL MOUNT SYSTEM FOR PERSONAL ELECTRONIC DEVICES

(71) Applicant: Innov8 Cabin Solutions, LLC, Kirkland, WA (US)

(72) Inventors: Steven R. Galipeau, Redmond, WA (US); Jason R. Danforth, Sammamish, WA (US); Jeffrey M. Pike, Lynnwood, WA (US)

(73) Assignee: Innov8 Cabin Solutions, LLC, Kirkland, WA (US)

( * ) Notice: Subject to any disclaimer, the term of this patent is extended or adjusted under 35 U.S.C. 154(b) by 100 days.

(21) Appl. No.: 16/031,198

(22) Filed: Jul. 10, 2018

(65) Prior Publication Data

US 2019/0011952 A1  Jan. 10, 2019

Related U.S. Application Data

(60) Provisional application No. 62/530,727, filed on Jul. 10, 2017, provisional application No. 62/570,001, filed on Oct. 9, 2017.

(51) Int. Cl.
*B64D 11/00* (2006.01)
*F16M 13/02* (2006.01)
(Continued)

(52) U.S. Cl.
CPC ........ *G06F 1/1632* (2013.01); *B64D 11/0015* (2013.01); *F16M 11/041* (2013.01);
(Continued)

(58) Field of Classification Search
CPC .. B64D 11/0015; B64D 11/00; F16M 11/041; F16M 13/02; F16M 13/022; G06F 1/1626; G06F 1/1632; G06F 1/16
(Continued)

(56) References Cited

U.S. PATENT DOCUMENTS 8,203,437 B2  6/2012  Galipeau et al.
8,238,420 B1  8/2012  Shankarappa
(Continued)

FOREIGN PATENT DOCUMENTS

DE    102018001341 A1 * 8/2019 ........... H05K 7/1481

OTHER PUBLICATIONS

Galipeau et al., "Aircraft Personal Content System," U.S. Appl. No. 62/415,273, filed Oct. 31, 2016, 43 pages.

*Primary Examiner* — Timothy J Thompson
*Assistant Examiner* — Guillermo J Egoavil
(74) *Attorney, Agent, or Firm* — Seed Intellectual Property Law Group LLP

(57) ABSTRACT

Systems and methods for providing wall mount systems for personal entertainment devices (PEDs) or other display devices that allow for replacement of older, expensive, obsolete, and/or heavy aircraft monitors with improved PEDs (e.g., tablets). A wall mount system may include a PED holder that securely and removably attaches to a docking base that is installable on a surface (e.g., wall of an aircraft cabin). The docking base may include one or more connectors or ports that provide at least one of power and/or data transfer capabilities. The PED holder removably holds a PED therein, and is removably attachable to the docking base via a quick release connector that does not require any tools to operate. The PED holder includes circuitry that allows the PED to be electrically coupled to the one or more connectors or ports of the docking base when the PED holder is attached to the docking base.

19 Claims, 38 Drawing Sheets

(51) Int. Cl.
*G06F 1/16* (2006.01)
*F16M 11/04* (2006.01)

(52) U.S. Cl.
CPC .......... *F16M 13/02* (2013.01); *F16M 13/022* (2013.01); *G06F 1/1626* (2013.01)

(58) Field of Classification Search
USPC .................. 174/480; 361/679.41; 312/223.1; 403/252; 348/837
See application file for complete search history.

(56) References Cited

U.S. PATENT DOCUMENTS

| | | |
|---|---|---|
| 8,369,082 B2 | 2/2013 | Madonna et al. |
| 8,469,323 B1 * | 6/2013 | Deros .................. F16M 11/105 248/123.11 |
| 8,585,315 B2 | 11/2013 | Van Kuijk et al. |
| 2002/0066392 A1 | 6/2002 | Calam et al. |
| 2009/0219174 A1 | 9/2009 | Kikuchi et al. |
| 2010/0138581 A1 | 6/2010 | Bird et al. |
| 2011/0147560 A1 | 6/2011 | Camarillo |
| 2011/0261273 A1 | 10/2011 | Weaver |
| 2012/0068832 A1 | 3/2012 | Feldstein et al. |
| 2012/0087069 A1 | 4/2012 | Fu et al. |
| 2012/0206867 A1 | 8/2012 | Pence |
| 2012/0287343 A1 | 11/2012 | Kelly et al. |
| 2014/0146982 A1 | 5/2014 | Pelosi |
| 2014/0265765 A1 | 9/2014 | Khodapanah et al. |
| 2014/0269895 A1 | 9/2014 | Ge et al. |
| 2015/0237750 A1 * | 8/2015 | Yang .................... F16M 11/041 206/45.2 |
| 2016/0248208 A1 | 8/2016 | Donia et al. |
| 2016/0297526 A1 * | 10/2016 | Everhart .......... B64D 11/00151 |
| 2017/0209318 A1 * | 7/2017 | Schroeder ................ A61G 3/00 |
| 2018/0027033 A1 | 1/2018 | Kamstrup |

* cited by examiner

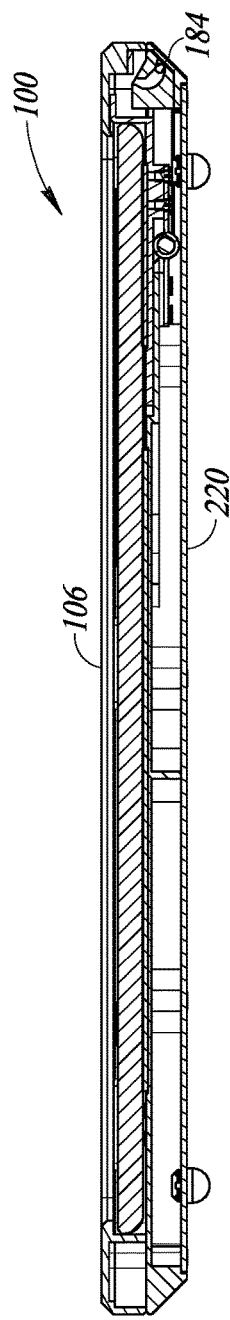
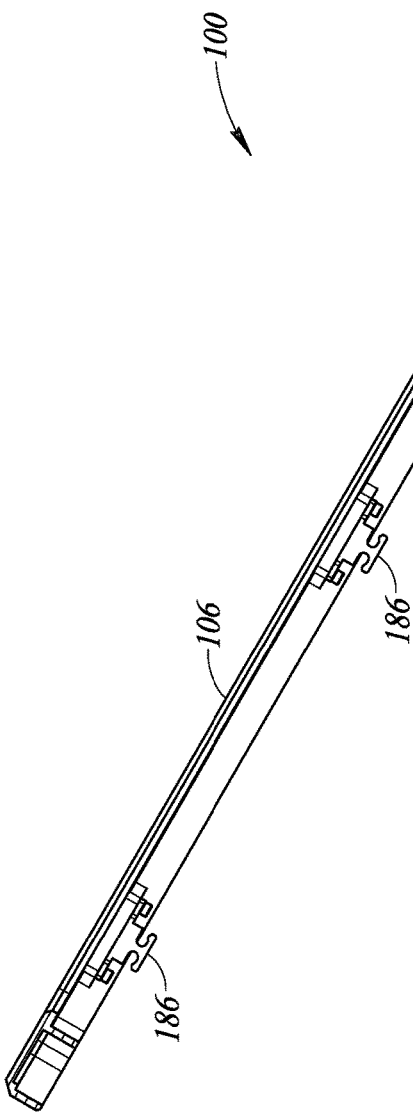
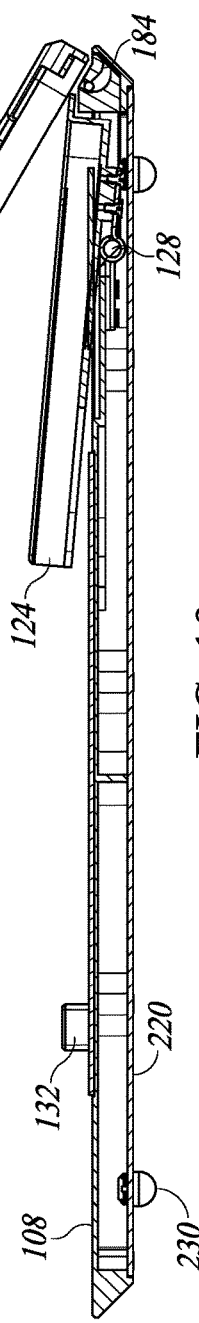
FIG. 18
FIG. 19

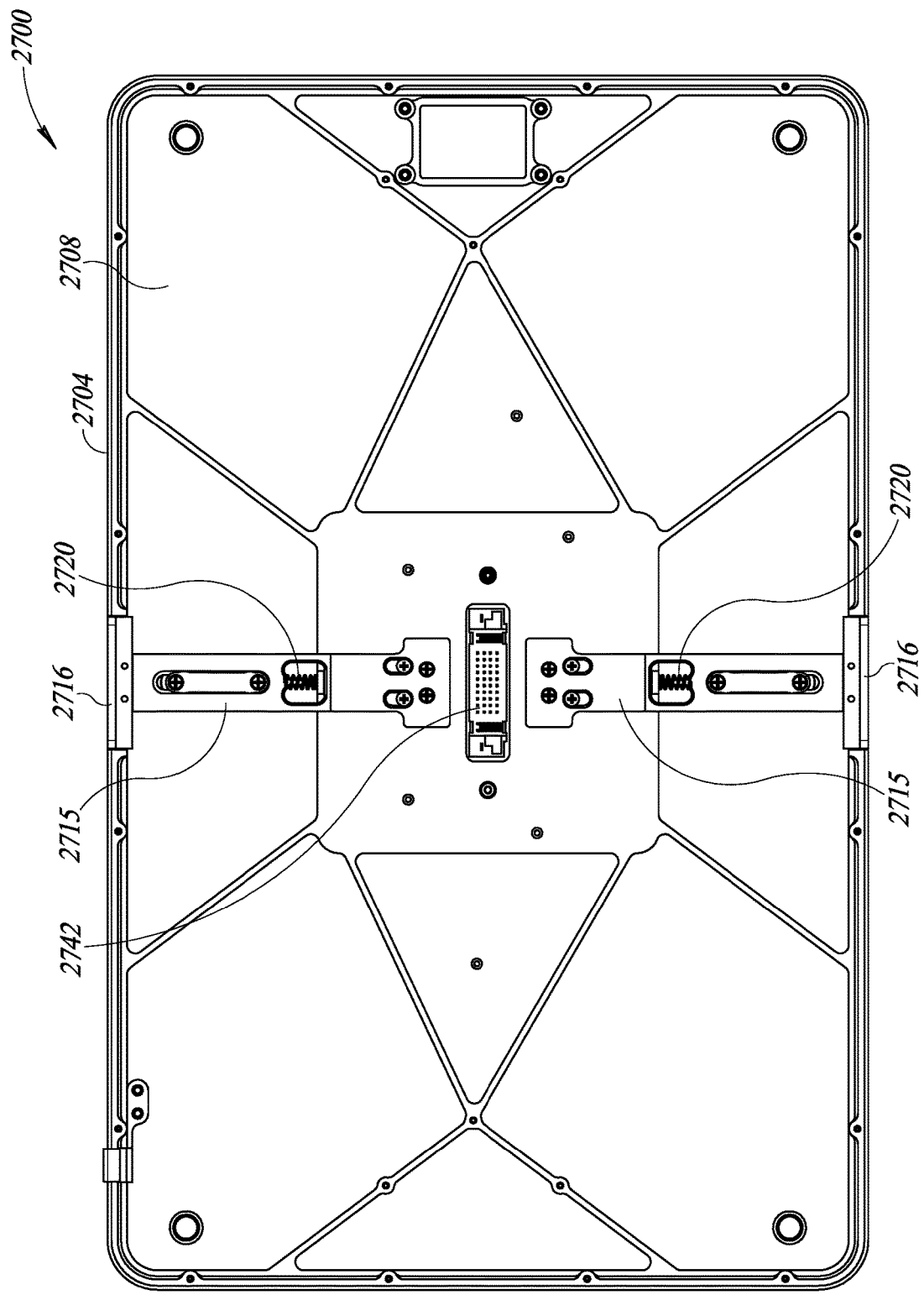

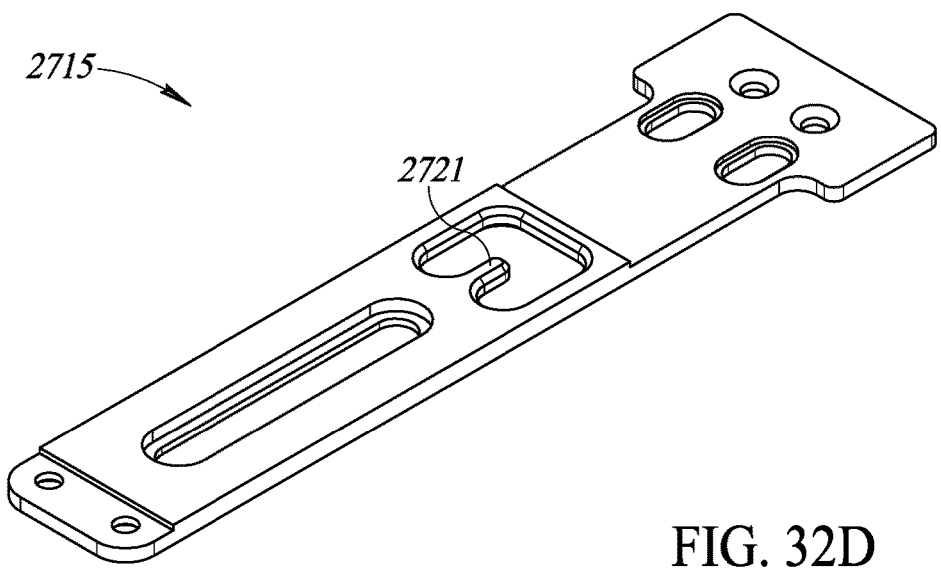
FIG. 32D
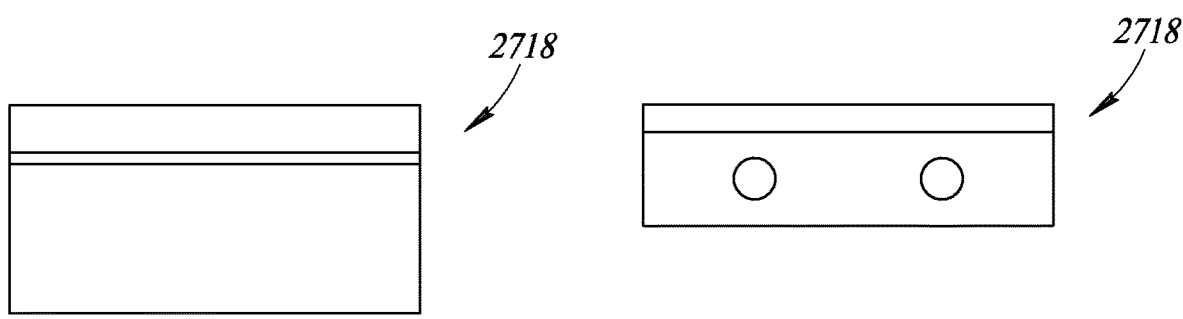
FIG. 33A
FIG. 33B
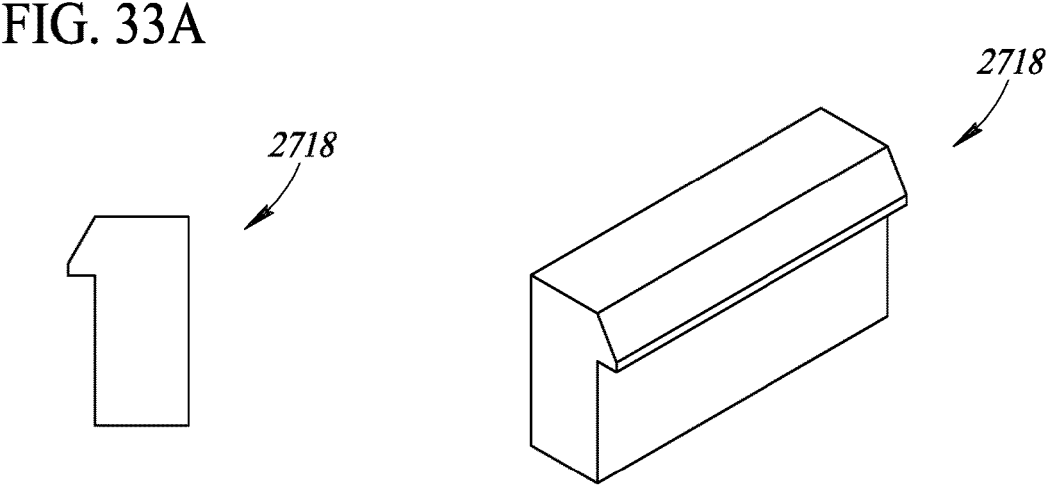
FIG. 33C
FIG. 33D

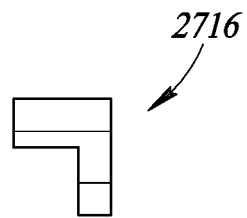
FIG. 34A
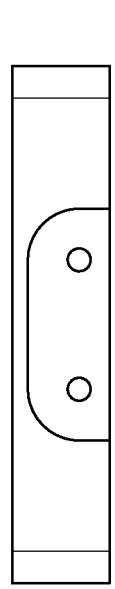
FIG. 34B
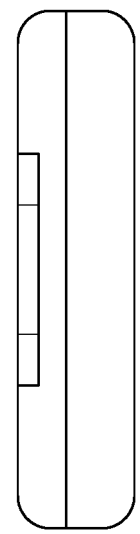
FIG. 34C
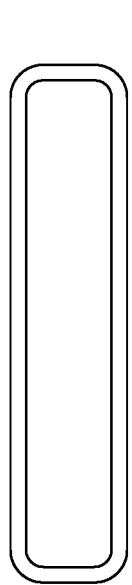
FIG. 34D
FIG. 34E
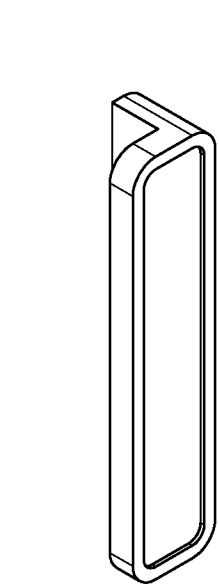
FIG. 34F

WALL MOUNT SYSTEM FOR PERSONAL ELECTRONIC DEVICES

BACKGROUND

Technical Field

The present disclosure generally relates to mounting systems for electronic devices having displays, such as personal electronic devices (PEDs) or other electronic devices having displays.

Description of the Related Art

Entertainment systems have long been incorporated into various types of aircraft, including personal and business aircraft, such as those that seat between 6-20 passengers. These legacy systems provide limited entertainment options for users who are increasingly able to access a broad range of entertainment regardless of their locations. In addition, the legacy systems may use older technologies and protocols that provide audio and/or video outputs of limited quality. Replacing the legacy systems on aircraft, though, may be technically difficult and prohibitively expensive. There exists, therefore, a need to upgrade and/or replace legacy audio/visual entertainment systems on aircraft with entertainment products and/or systems that can take advantage of the improved technology provided by modern personal entertainment devices, such as tablet computers or other display devices.

BRIEF SUMMARY

A wall mount system for a personal entertainment device (PED) may be summarized as including: a docking base selectively attachable to a wall, the docking base including a docking base connector that in operation supplies at least one of power or data to a PED; and a PED holder including: a housing sized and dimensioned to removably receive a PED; a quick release connector coupled to the housing and extending outwardly from a rear side thereof, in operation the quick release connector selectively attaches to the docking base, the quick release connector including a release member accessible from a front side of the housing opposite the rear side of the housing when the PED is removed from the housing, the release member movable between a locked position wherein the quick release connector is secured to the docking base and an unlocked positioned wherein the quick release connector is removable from the docking base; a first PED holder connector that physically and electrically connects with the docking base connector of the docking base when the quick release connector is attached to the docking base; and a second PED holder connector electrically coupled to the first PED holder connector, in operation the second PED holder connector physically and electrically connects with a PED connector of a PED received by the housing of the PED holder.

The wall mount system may further include: a cradle sized and dimensioned to receive at least a portion of the PED; and at least one hinge coupled between the cradle and the housing, the at least one hinge may permit the cradle to pivot relative to the housing about the hinge, wherein the second PED holder connector may be coupled to the cradle. The wall mount system may further include: an eject pin disposed on the front side of the housing; and a resilient member which biases the eject pin outwardly from the front side of the housing. The wall mount system may further include: a slide latch coupled to the front side of the housing, the slide latch movable between a locked position wherein the slide latch retains the PED in the housing and an unlocked positioned wherein the slide latch does not retain the PED in the housing. The slide latch may be biased toward the locked position. The slide latch may be biased toward the locked position by a slide latch spring. The wall mount system may further include: a cable electrically coupled between the first PED holder connector and the second PED holder connector. The quick release connector may include: a latch base that includes one or more contact ball bearings, and the release member may be slideable over at least a portion of the latch base between the locked position and the unlocked position, wherein in the locked position the release member may exert an inward force against the one or more contact ball bearings which cause the one or more contact ball bearings to engage corresponding detents in the docking base to retain attachment of the quick release connector to the docking base. The quick release connector may include a four-sided ball latch. The wall mount system may further include: a bezel that is selectively attachable to the front side of the housing. The bezel may be selectively attachable to the front of the housing via at least one slot hinge. The bezel may include at least one latch, and the housing may include at least one latch strike plate that in operation selectively receives the at least one latch of the bezel. The bezel may be pivotable about a hinge coupled to the housing between a closed position wherein a rear side of the bezel is at least substantially adjacent the front side of the housing, and an open position wherein at least a portion of the rear side of the bezel is spaced apart from the front side of the housing. The wall mount system may further include a bezel latch assembly that selectively retains the bezel in the closed position. When the bezel is in the closed position, the bezel may be slideable relative to the housing between a bezel locked position wherein the bezel latch assembly retains the bezel in the closed position, and a bezel unlocked position wherein the bezel latch assembly allows the bezel to be rotated into the open position.

A wall mount system for a plurality of personal entertainment devices (PEDs) may be summarized as including: a docking base selectively attachable to a wall, the docking base including a docking base connector that in operation supplies at least one of power or data to a PED; and a plurality of PED holders, each PED holder including: a housing sized and dimensioned to removably receive a respective one of a plurality of PEDs, each of the plurality of PEDs differing from each other PED in at least one aspect; a quick release connector coupled to the housing and extending outwardly from a rear side thereof, in operation the quick release connector selectively attaches to the docking base, the quick release connector including a release member accessible from a front side of the housing opposite the rear side of the housing when the PED is removed from the housing, the release member movable between a locked position wherein the quick release connector is secured to the docking base and an unlocked positioned wherein the quick release connector is removable from the docking base; a first PED holder connector that physically and electrically connects with the docking base connector of the docking base when the quick release connector is attached to the docking base; and a second PED holder connector electrically coupled to the first PED holder connector, in operation the second PED holder connector physically and electrically connects with a PED connector of a PED received by the housing of the PED holder.

A personal entertainment device (PED) holder may be summarized as including: a housing sized and dimensioned to removably receive a PED; a quick release connector coupled to the housing and extending outwardly from a rear side thereof, in operation the quick release connector selectively attaches to a docking base, the quick release connector including a release member accessible from a front side of the housing opposite the rear side of the housing when the PED is removed from the housing, the release member movable between a locked position wherein the quick release connector is secured to the docking base and an unlocked positioned wherein the quick release connector is removable from the docking base; a first PED holder connector that physically and electrically connects with a docking base connector of the docking base when the quick release connector is attached to the docking base; and a second PED holder connector electrically coupled to the first PED holder connector, in operation the second PED holder connector physically and electrically connects with a PED connector of a PED received by the housing of the PED holder.

A method of operating a wall mount system for a personal entertainment device (PED), the method including: attaching a docking base to a wall, the docking base including a docking base connector that in operation supplies at least one of power or data to a PED; providing a PED holder including: a housing sized and dimensioned to removably receive a PED; a quick release connector coupled to the housing and extending outwardly from a rear side thereof, in operation the quick release connector selectively attaches to the docking base, the quick release connector including a release member accessible from a front side of the housing opposite the rear side of the housing when the PED is removed from the housing, the release member movable between a locked position wherein the quick release connector is secured to the docking base and an unlocked positioned wherein the quick release connector is removable from the docking base; a first PED holder connector that physically and electrically connects with the docking base connector of the docking base when the quick release connector is attached to the docking base; and a second PED holder connector electrically coupled to the first PED holder connector, in operation the second PED holder connector physically and electrically connects with a PED connector of a PED received by the housing of the PED holder; positioning the quick release connector of the PED holder proximate the docking base; actuating the release member of the quick release connector to attach the quick release connector to the docking base; and positioning a PED within the housing of the PED holder.

The method may further include: removing the PED from the housing of the PED holder; actuating the release member of the quick release connector; and disengaging the quick release connector from the docking base. The housing may include a cradle, and positioning the PED within the housing may include positioning the PED within the cradle of the housing.

A wall mount system for a personal entertainment device (PED) may be summarized as including: a docking base selectively attachable to a wall, the docking base comprising a docking base connector that in operation supplies at least one of power or data to a PED; and a PED holder including: a housing sized and dimensioned to removably receive a PED; a quick release connector coupled to the housing and extending outwardly from a rear side thereof, in operation the quick release connector selectively attaches to the docking base, the quick release connector comprising a release member accessible from a side of the housing other than the rear side of the housing, the release member movable between a locked position wherein the quick release connector is secured to the docking base and an unlocked positioned wherein the quick release connector is removable from the docking base; a first PED holder connector that physically and electrically connects with the docking base connector of the docking base when the quick release connector is attached to the docking base; and a second PED holder connector electrically coupled to the first PED holder connector, in operation the second PED holder connector physically and electrically connects with a PED connector of a PED received by the housing of the PED holder.

The release member may be accessible from a top side and a bottom side of the housing. The wall mount system may include a cradle sized and dimensioned to receive at least a portion of the PED; and at least one hinge coupled between the cradle and the housing, the at least one hinge permits the cradle to pivot relative to the housing about the hinge, wherein the second PED holder connector is coupled to the cradle. The wall mount system may further include a bezel that is selectively attachable to the front side of the housing. The docking base may supply user-selectable DC power. The docking base may supply DC power that is controllable at least in part by a PED held by the PED holder. The quick release connector may include a first latch slide assembly accessible from a top side of the housing, and a second latch slide assembly accessible from a bottom side of the housing.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 18 is a sectional view of the PED holder taken along the line B-B of FIG. 16, according to one illustrated implementation.

FIG. 19 is a sectional view of the PED holder taken along the line B-B of FIG. 16, with the PED shown removed from the PED holder and the bezel pivoted into the open position, according to one illustrated implementation.

FIG. 29 shows a front elevational view of a latch slide assembly of the PED holder of FIGS. 27A-27F, according to one illustrated implementation.

FIGS. 32A-32D show various views of a latch slide of the PED holder, according to one illustrated implementation.

FIGS. 33A-33D show various views of a latch hook of the PED holder, according to one illustrated implementation.

FIGS. 34A-34F show various views of a latch button of the PED holder, according to one illustrated implementation.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 21:
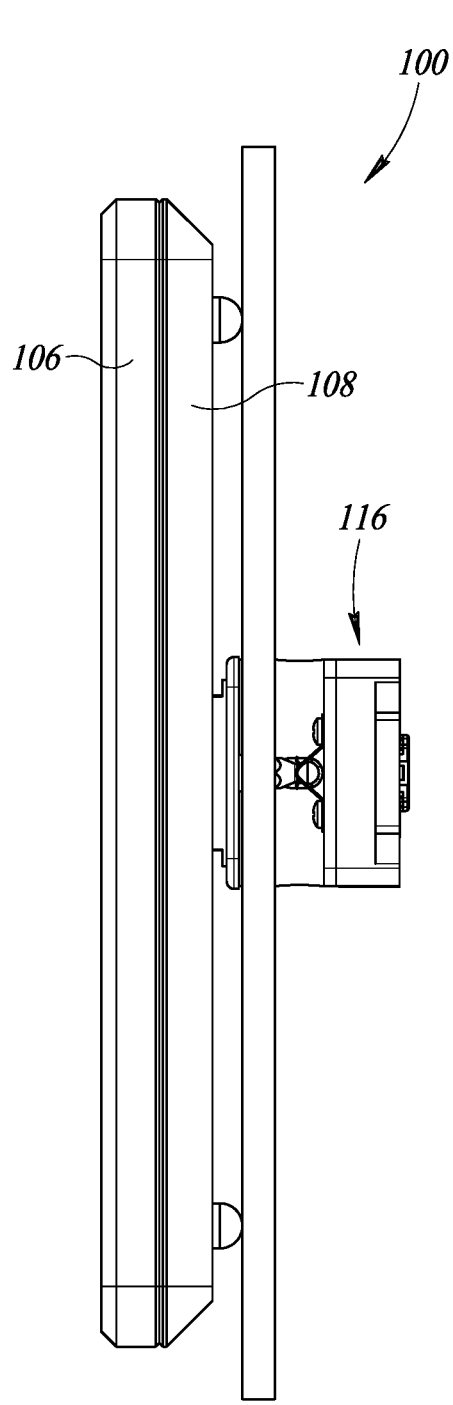
FIG. 21 is a left side elevational view of the wall mount system installed on a wall in a proud mount configuration, according to one illustrated implementation.
Figure 22:
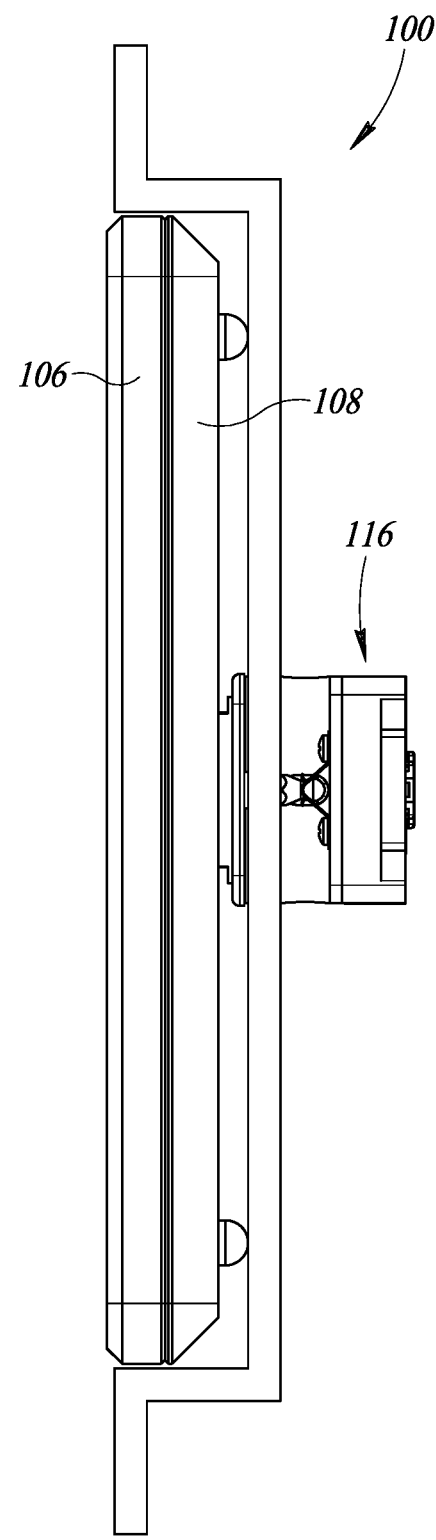
FIG. 22 is a left side elevational view of the wall mount system installed on a wall in a flush mount configuration, according to one illustrated implementation.
Figure 23:
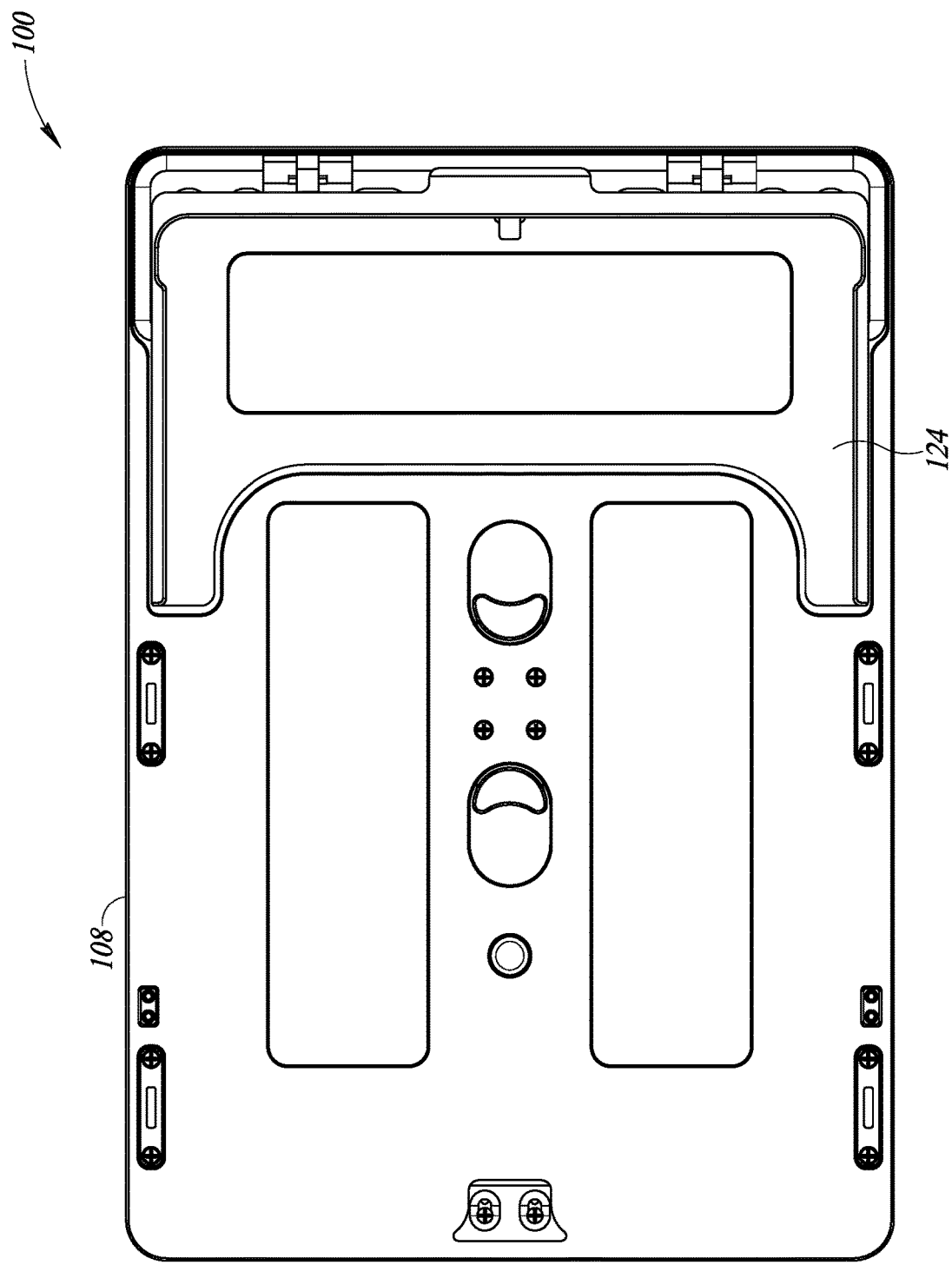
FIG. 23 is a front elevational view of the PED holder showing various non-limiting example dimensions thereof, according to one illustrated implementation.
Figure 24:
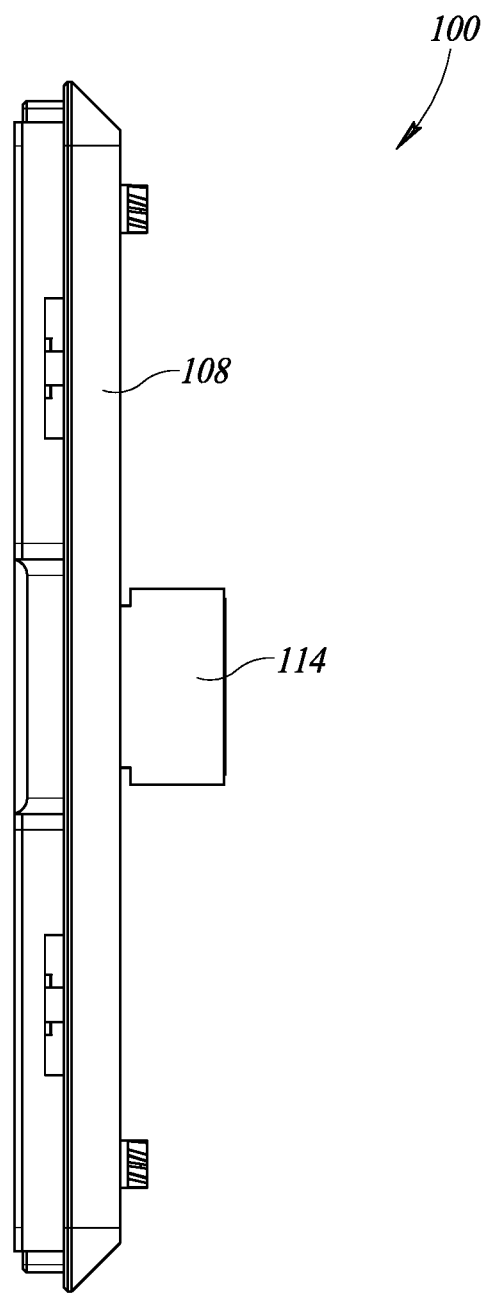
FIG. 24 is a left side elevational view of the PED holder showing various non-limiting example dimensions thereof, according to one illustrated implementation.
Figure 25:
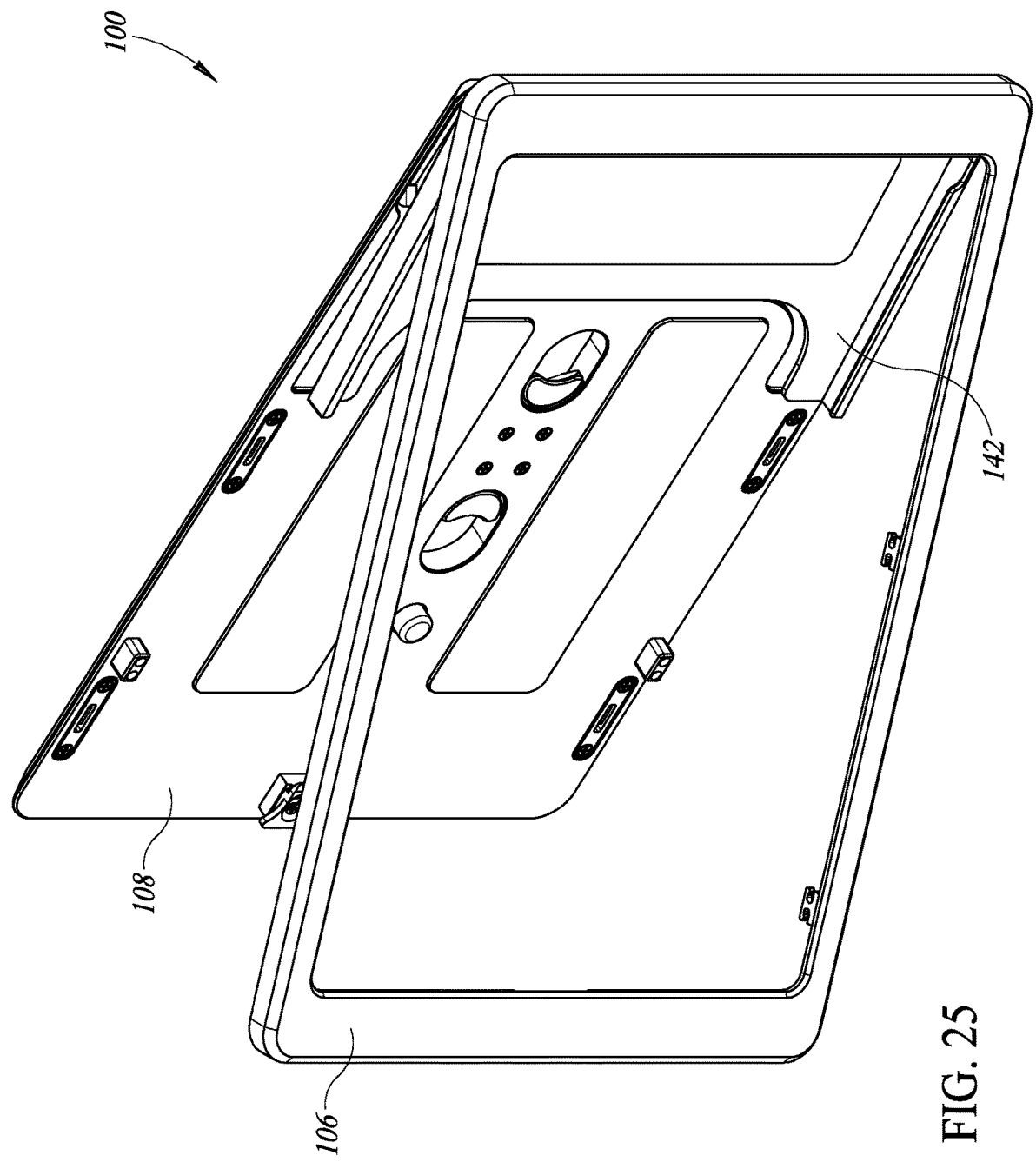
FIG. 25 is a front perspective view of the PED holder showing the bezel in an open position, according to one illustrated implementation.

One or more implementations of the present disclosure are directed to wall mount systems for PEDs that allow for replacement of older, expensive, obsolete, and/or heavy aircraft monitors with improved PEDs (e.g., tablet computers, smart phones, other display devices). As used herein, PED may refer generally to any electronic device that includes a display, such as a tablet computer, flat panel television, smart phone, etc. As discussed further below with reference to the drawings, a wall mount system may include a PED holder that securely and removably attaches to a docking base or "mount" that is installable on a surface (e.g., wall) of a vehicle (e.g., aircraft). The docking base may include one or more connectors or ports that provide at least one of power and/or data transfer capabilities. The PED holder holds a PED therein, and is removably attachable to the docking base via a quick release connector that does not require any tools to operate. The PED holder includes circuitry that allows the PED to be selectively electrically coupled to the one or more connectors or ports of the docking base when the PED holder is attached to the docking base, such that the PED receives power from the docking base and optionally receives or transmits data via the docking base. The docking base and PED holder may be mounted on a wall or other surface to provide a proud mount configuration (see FIG. 21) or a flush mount configuration (see FIG. 22), for example. In at least some implementations, the PED holder includes the PED itself. In at least some implementations, the PED holder removably receives a PED therein.

In operation, the PED held by the PED holder may display content stored on the PED's internal memory or received from an external source. For example, the PED may receive content wirelessly via a cabin management system (CMS) associated with the aircraft or from another data source. As another example, the PED may receive content at a data port of the PED via the PED holder and the docking base, which may be communicatively coupled to a CMS associated with the aircraft. For instance, content may be provided to the PED using an A/V converter, such as the converter described in U.S. Provisional Application No. 62/415,273, filed Oct. 31, 2016, titled AIRCRAFT PERSONAL CONTENT SYSTEM, the contents of which are incorporated by reference herein in its entirety.

In at least some implementations, the PED holder (and PED) may be detached from the docking base during taxi, takeoff and landing of an aircraft, which may allow the PED holder and PED to be considered by regulators as "carry on" devices. In at least some implementations, the PED holder and docking base may be attached during taxi, takeoff and landing, and the PED may be removed from the PED holder during taxi, takeoff and landing, such that the PED is considered a carry on device. In at least some implementations, the docking base, PED holder and PED may be attached during taxi, takeoff and landing, and may be certified together as permanent aircraft installations.

In at least some implementations, a number of different PED holders may be provided to hold different types of PEDs. For example, a first PED holder may be sized, dimensioned, and otherwise configured to hold a 12.9 inch iPad Pro® by Apple Inc., while a second PED holder may be sized, dimensioned, and otherwise configured to hold a 12.3 inch Surface Pro® by Microsoft Corp. Each of the plurality of PED holders may include a quick release connector that allows for selective attachment to any docking base. Thus, PED holders (and PEDs) may be moved from one docking base on an aircraft to a different docking base on the same or different aircraft. Further, different PEDs may be coupled to a single installed docking base without requiring modifications to the docking base. Such feature allows for simple future upgrades of displays. For example, to upgrade or change a display, a new PED may simply be positioned in an existing PED holder. As another example, to upgrade a display, a new PED holder may be provided that is sized, dimensioned, and otherwise configured to hold a new type of PED, and the new PED holder may simply be attached to an existing installed docking base. Various examples of wall mount systems of the present disclosure are discussed below with reference to the Figures.

Figure 1:
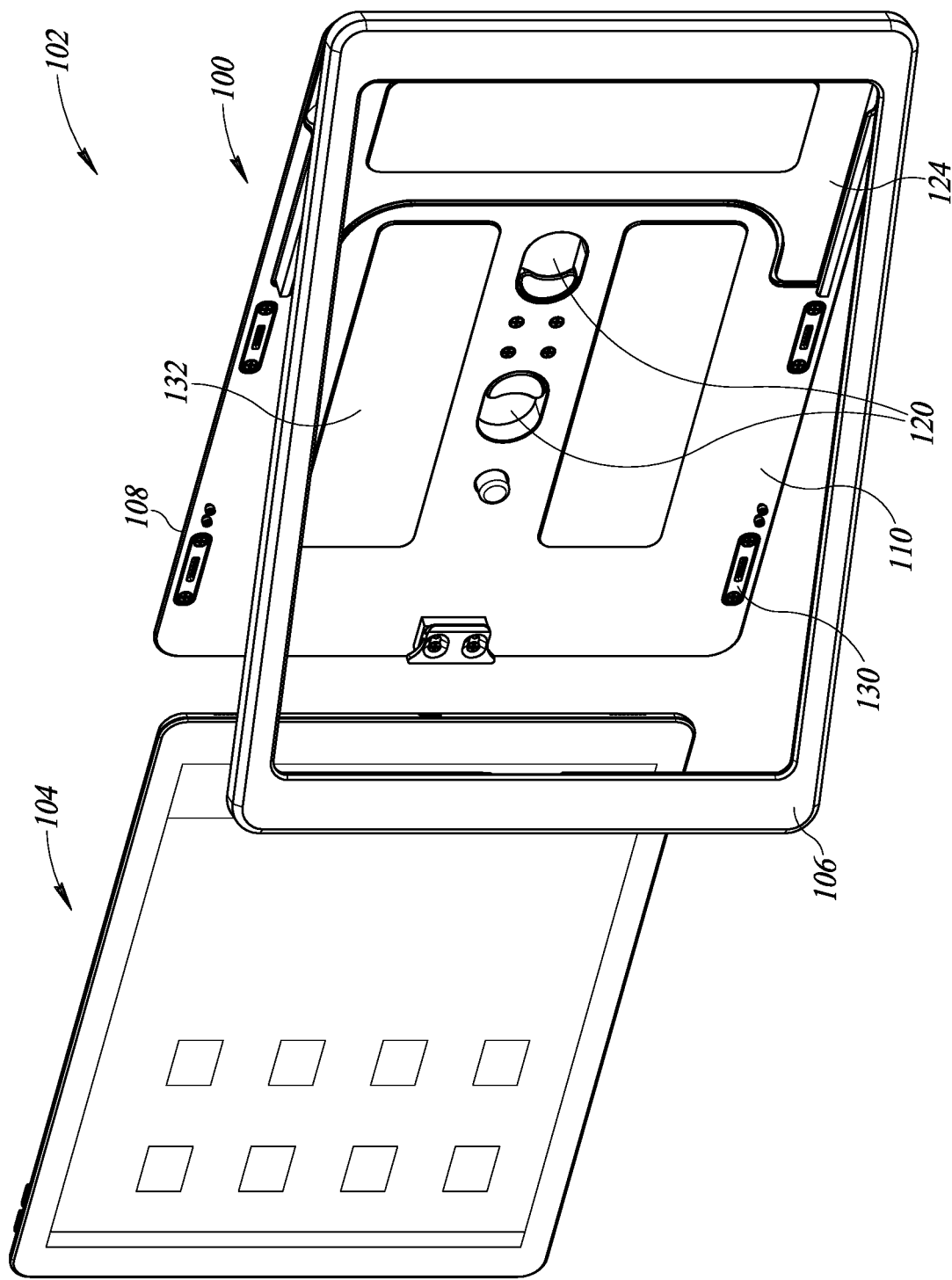
FIG. 1 is a front perspective view of a personal electronics device (PED) holder of a wall mount system for a PED, shown with a bezel of the PED holder in an open position and a PED positioned adjacent the PED holder, according to one illustrated implementation.
Figure 2:
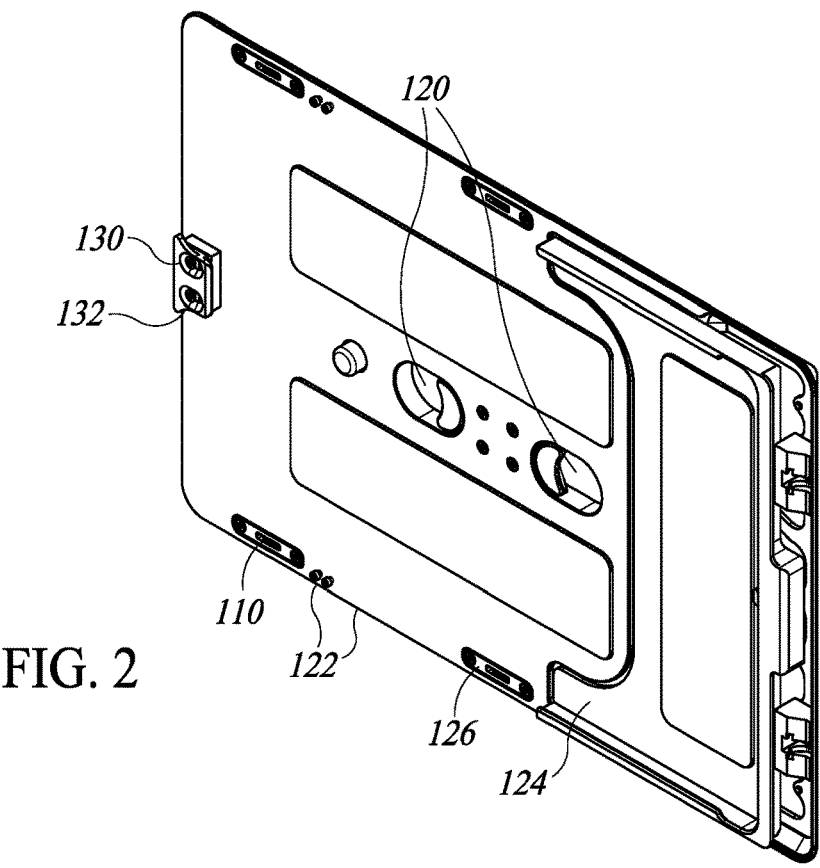
FIG. 2 is a front perspective view of the PED holder with the bezel removed, according to one illustrated implementation.
Figure 3:
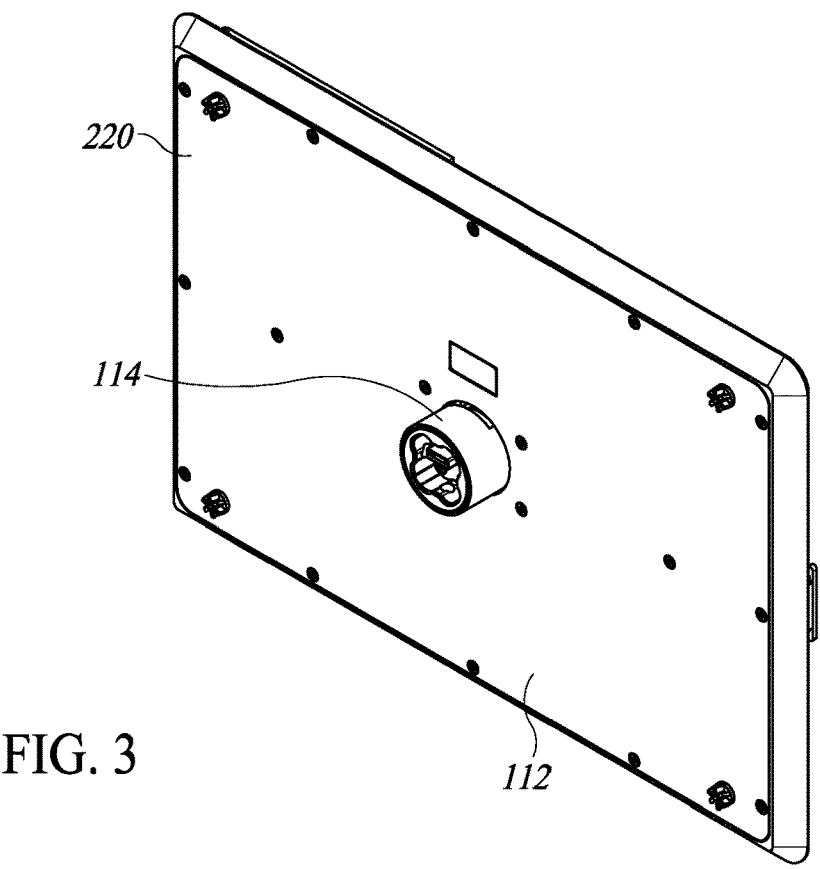
FIG. 3 is a rear perspective view of the PED holder, according to one illustrated implementation.

FIG. 1 is a front perspective view of a personal electronics device (PED) holder 100 of a wall mount system 102 for a PED 104, shown with a removable bezel 106 of the PED holder in an open position and the PED positioned proximate the PED holder to be received therein. As shown in FIGS. 1-3, the PED holder 100 includes a housing 108 having a front side 110 and a rear side 112 opposite the front side. A quick release connector 114 (FIG. 3) is coupled to the housing 108 and extends outwardly from the rear side 112 thereof to face a mounting surface (e.g., wall). As discussed further below, in operation the quick release connector 114 selectively attaches to a docking base 116 (see FIGS. 11, 12 and 17A-B). As shown in FIGS. 1 and 2, the quick release connector 114 includes a release member or slide 118 that is accessible from the front side 110 of the housing 108 via apertures 120 in the housing when the PED 104 is removed from the housing. The release member 118 includes grasping portions 122 that allow the release member to be movable by a hand of a user between a locked position wherein the quick release connector 114 (and PED holder 100) is secured to the docking base 116, and an unlocked positioned wherein the quick release connector is removable from the docking base. In the example implementation, the quick release connector 114 may be pushed to move the release member 118 into the locked or "pushed in" position and pulled to move the release member into the unlocked or "pulled out" position.

The PED holder 100 also includes a cradle or cradle assembly 124 that includes a pocket 126 sized and dimensioned to removably receive at least a portion of the PED 104. As discussed further below, the cradle assembly 124 may be coupled to the housing 108 via one or more hinges 128 (FIG. 7) that permit the cradle assembly to pivot relative to the housing 108 so that the PED 104 may be easily inserted into and removed from the PED holder 100, even in flush or recessed mount configurations.

As shown in FIGS. 1 and 2, the PED holder 100 includes a slide latch assembly 130 positioned proximate a right side end of the front side 110 of the housing 108. The slide latch assembly 130 may operate to retain the PED 104 in the cradle assembly 124. The slide latch assembly 130 may be movable between a locked position wherein the slide latch assembly retains the PED 104 in the cradle 124 of the housing 108, and an unlocked positioned wherein the slide latch assembly allows the PED to be removed from the cradle of the housing. The slide latch assembly 130 may be biased toward the locked position by a suitable resilient member (e.g., a spring) to retain the PED 104 in the cradle 124 of the housing 108.

In at least some implementations, the PED holder 100 may also include an eject pin 132 positioned on the front side 110 of the housing 108. The eject pin 132 may be biased outwardly by a resilient member (e.g., a spring) so that when the slide latch assembly 130 is moved from the locked position to the unlocked position, the eject pin exerts a force on a rear side of the PED 104 that causes the PED and the cradle assembly 124 to pivot forward to allow the user to grasp and remove the PED from the PED holder 100.

FIGS. 4-10 show the PED holder 100 during various stages of an example assembly process. Each of these stages is discussed below.

Figure 4:
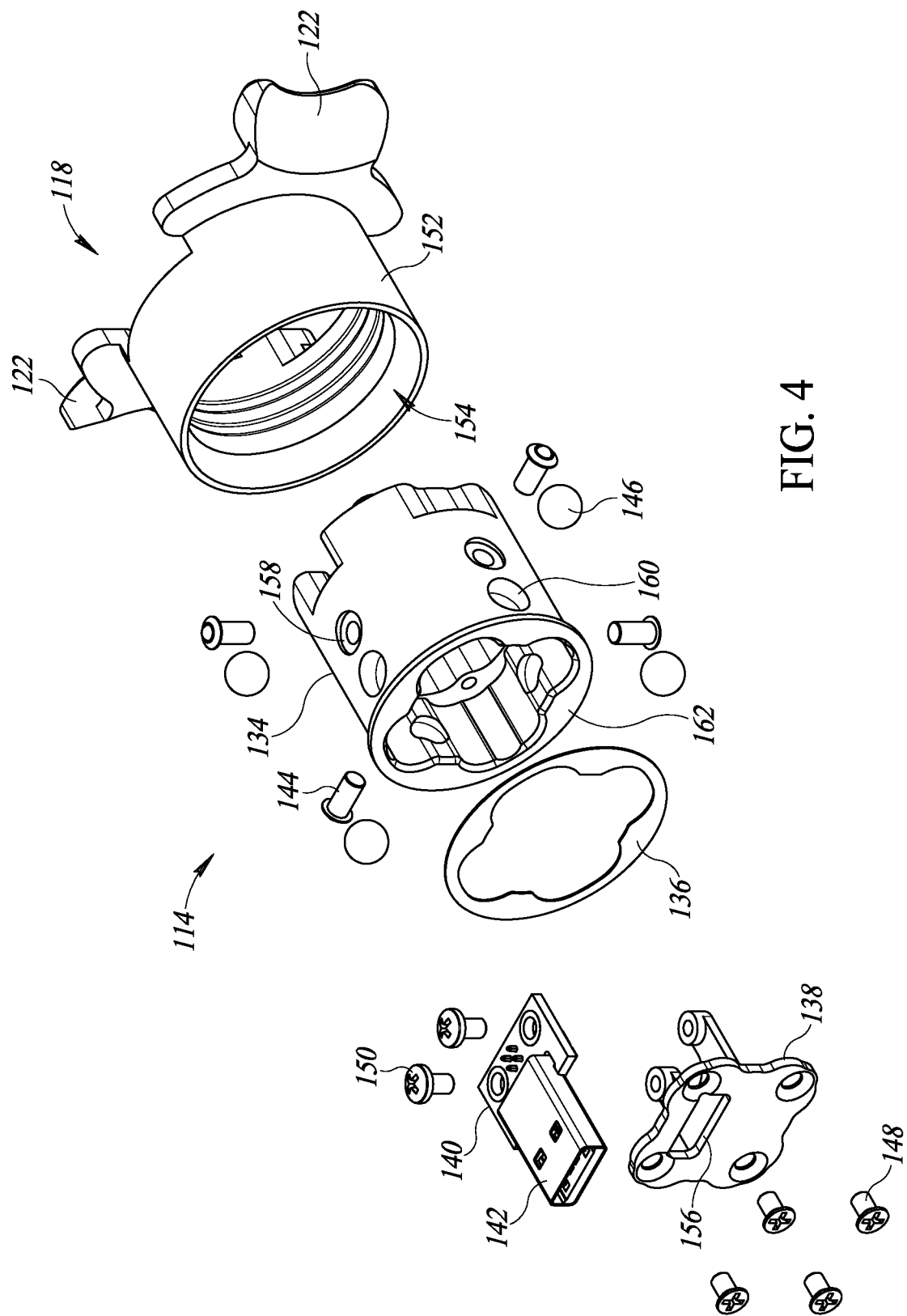
FIG. 4 is a partially exploded perspective view of a quick release connector of the PED holder, according to one illustrated implementation.

FIG. 4 is a partially exploded perspective view of the quick release connector or latch base assembly 114 of the PED holder 100. The quick release connector 114 includes a latch base 134, the movable release slide 118, a base label 136, a base cap 138, a circuit card assembly (CCA) 140 with one or more connectors 142 (e.g., male USB connector), four flanged release ball bearings or plungers 144, four contact ball bearings 146, four flat head screws 148, and two pan head screws 150. The release slide 118 includes cylindrically shaped body 152 having a hollow opening 154 therein, and the pair of opposing grasping portions 122 that may be grasped by a user during operation. The one or more connectors 142 of the CCA 140 are positioned through an aperture 156 in the base cap 138, and the CCA 140 is attached to the base cap with the two pan head screws 150. The base cap 138 is inserted into the latch base 134 and secured thereto with the four flat head screws 148. The four release ball bearings or plungers 144 are inserted into four respective smaller holes 158 in the latch base 134. The release slide 118 is aligned to the latch base 134 and the latch base is inserted up to four larger holes 160 in the latch base 134. The four contact ball bearings 146 are placed into the four respective larger holes 160 in the latch base 134. The latch base 134 is then pushed into the hollow opening 154 of the release slide 118 to capture the four contact ball bearings 146. The base label 136 is then adhered to a bottom surface 162 of the latch base 134 using a suitable adhesive. The operation of the latch base assembly 114 is discussed further below with reference to FIGS. 17A-B and 20A-B.

Figure 5:
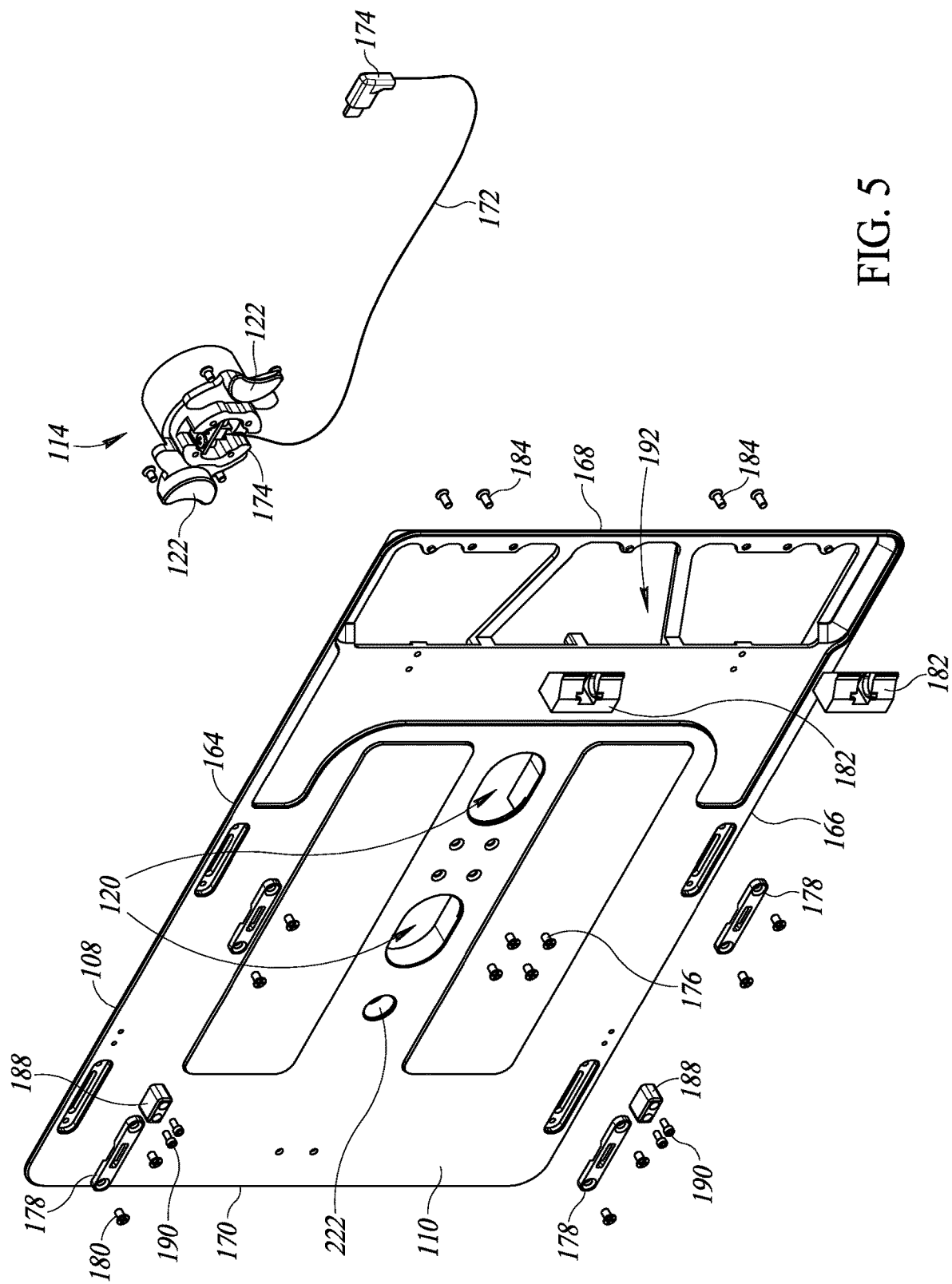
FIG. 5 is a partially exploded perspective view of a portion of the PED holder, showing attachment of the quick release connector, according to one illustrated implementation.

FIG. 5 is a partially exploded perspective view of a portion of the PED holder 100, showing attachment of the assembled quick release connector 114 to the unit housing 108 of the PED holder. The unit housing has a top edge 164, a bottom edge 166, a left edge 168 and a right edge 170. A cable 172 (e.g., Lightning® cable from Apple, Inc.) has a first end 174 that is attached to the CCA 140 of the quick release connector 114 to provide electrical coupling between the cable and the one or more connectors 142 of the CCA. The cable 172 includes a PED connector 174 (e.g., Lightning® connector) positioned at a second end of the cable opposite the first end. As discussed further below, the PED connector 174 of the cable 172 connects to a PED received within the PED holder 100. The two grasping portions 122 of the quick release connector 114 are inserted into the respective openings 120 in the unit housing 108 from the rear side thereof. The quick release connector 114 is attached to the unit housing via four screws 176. The grasping portions 122 may be flush with or recessed behind the front side 110 of the unit housing 108 when the release slide is in the pushed in or locked position. Four bezel latch strike plates 178 are attached to the front side 110 of the unit housing 108 by screws 180 proximate the bottom edge 166 and the top edge 164 of the unit housing. Two hinge slide blocks 182 are also attached to the front side 110 of the unit housing 108 by screws 184. As discussed below, the hinge slide blocks 182 provide slot hinges for the bezel 106, and the bezel latch strike plates 178 include apertures that selectively receive bezel latches 186 (FIG. 19) of the bezel 106 to selectively lock and unlock the bezel. Further, two PED guides 188 are attached to the front side 110 of the unit housing 108 with screws 190 proximate the top edge 164 and the bottom edge 166 to assist with maintaining the PED 104 in position in the PED holder 100.

Figure 6:
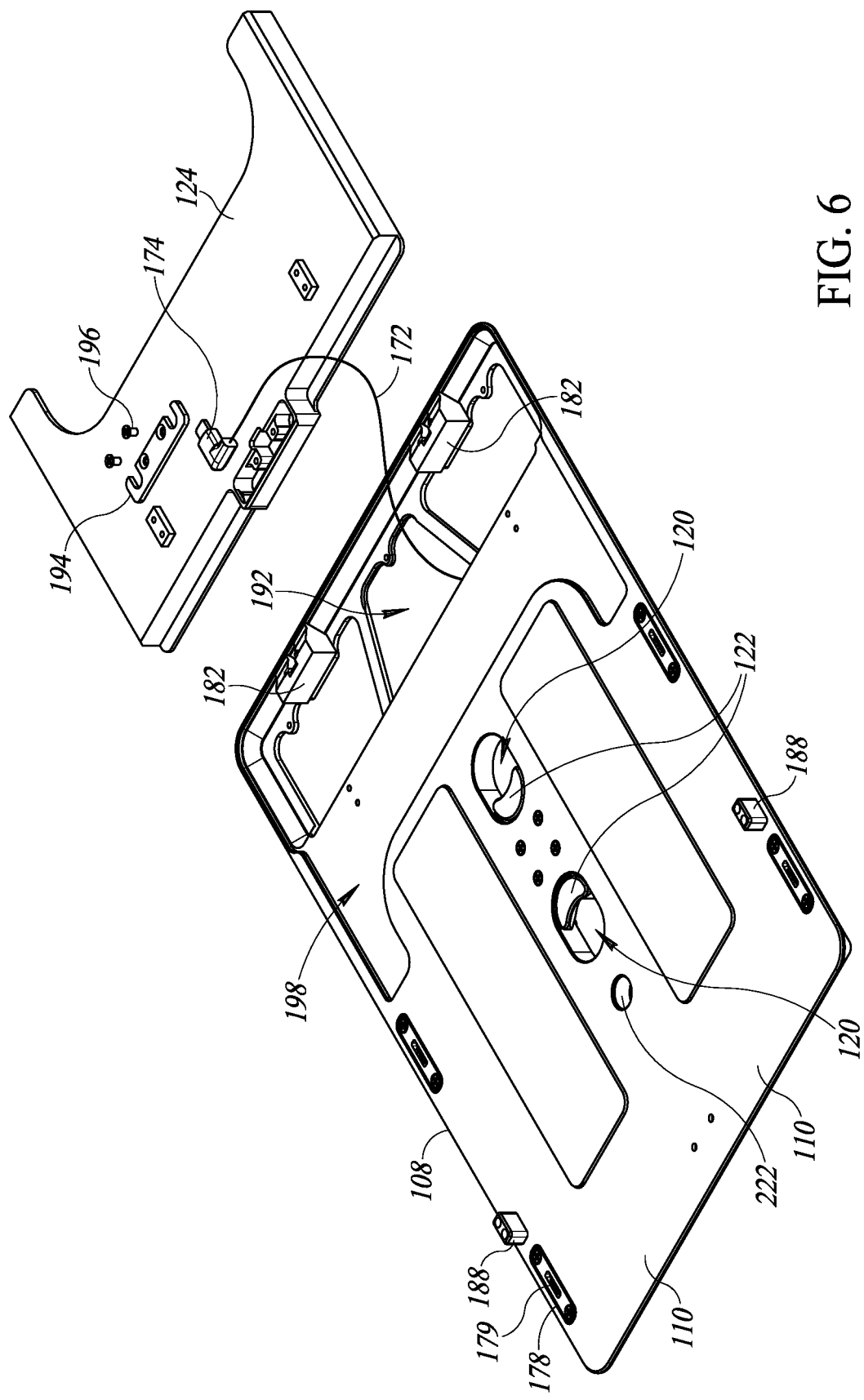
FIG. 6 is a partially exploded perspective view of a portion of the PED holder, showing securing of a cable of the PED holder, according to one illustrated implementation.

FIG. 6 is a partially exploded perspective view of a portion of the PED holder 100, showing the securing of the cable 172 of the PED holder. The cable 172 may be fed through a large center opening 192 in the unit housing 108. The PED connector 174 of the cable 172 may be inserted into the 126 pocket (FIG. 9) of the cradle 124. While the PED connector 174 is pushed back against an inside wall of the cradle 124, the cable may be secured in place with a retainer 194 and screws 196.

Figure 7:
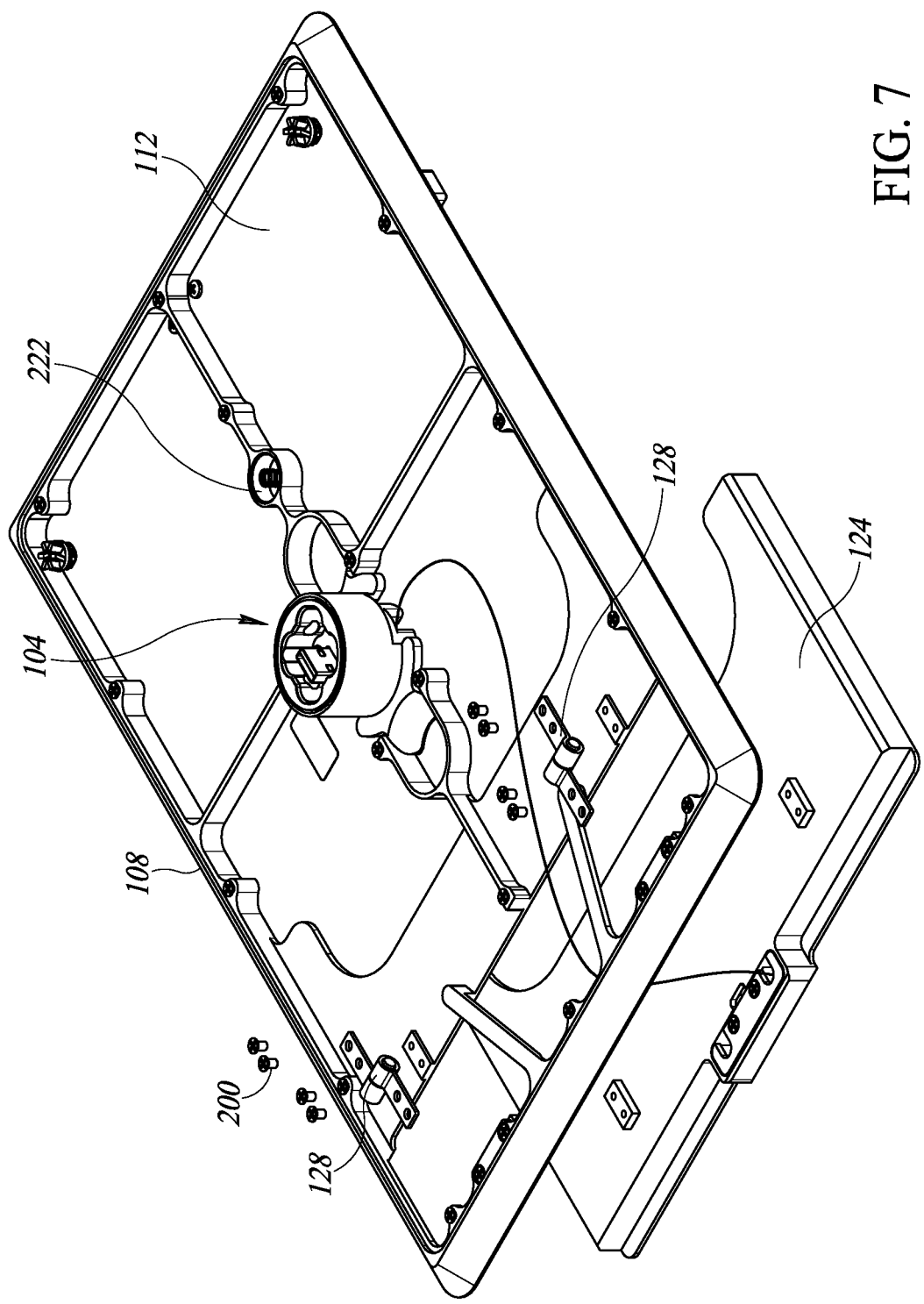
FIG. 7 is a partially exploded perspective view of a portion of the PED holder, showing attachment of a cradle assembly of the PED holder, according to one illustrated implementation.

FIG. 7 is a partially exploded perspective view of a portion of the PED holder 100, showing attachment of the cradle 124 of the PED holder to the unit housing 108. The cradle 124 is positioned into a pocket 198 (FIG. 6) in the unit housing 108. Hinges 128 (e.g., friction hinges) are coupled to the unit housing 108 and the cradle 124 using screws 200 to rotatably secure the cradle to the unit housing.

Figure 8:
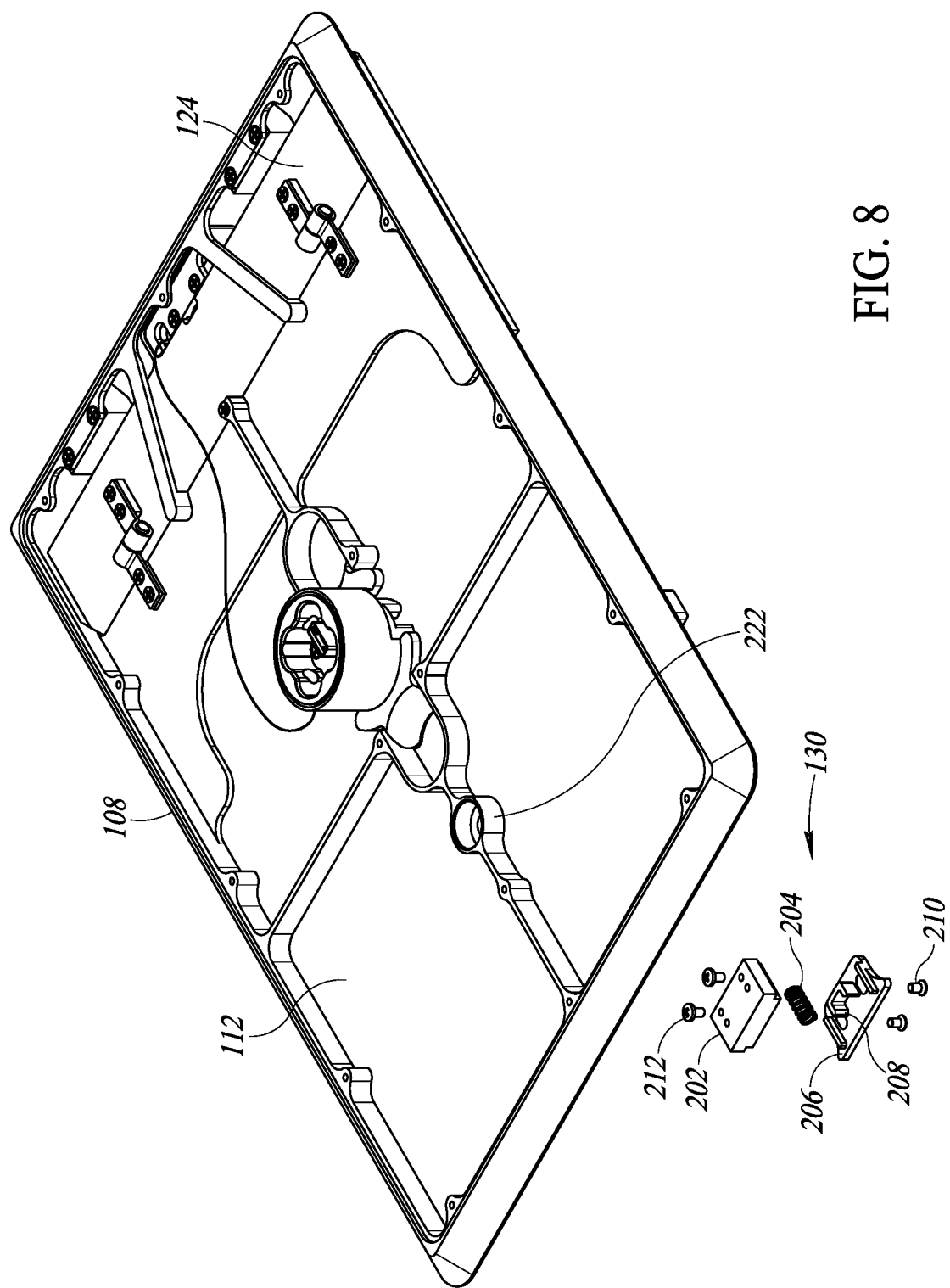
FIG. 8 is a partially exploded perspective view of a portion of the PED holder, showing a slide latch assembly of the PED holder, according to one illustrated implementation.
Figure 9:
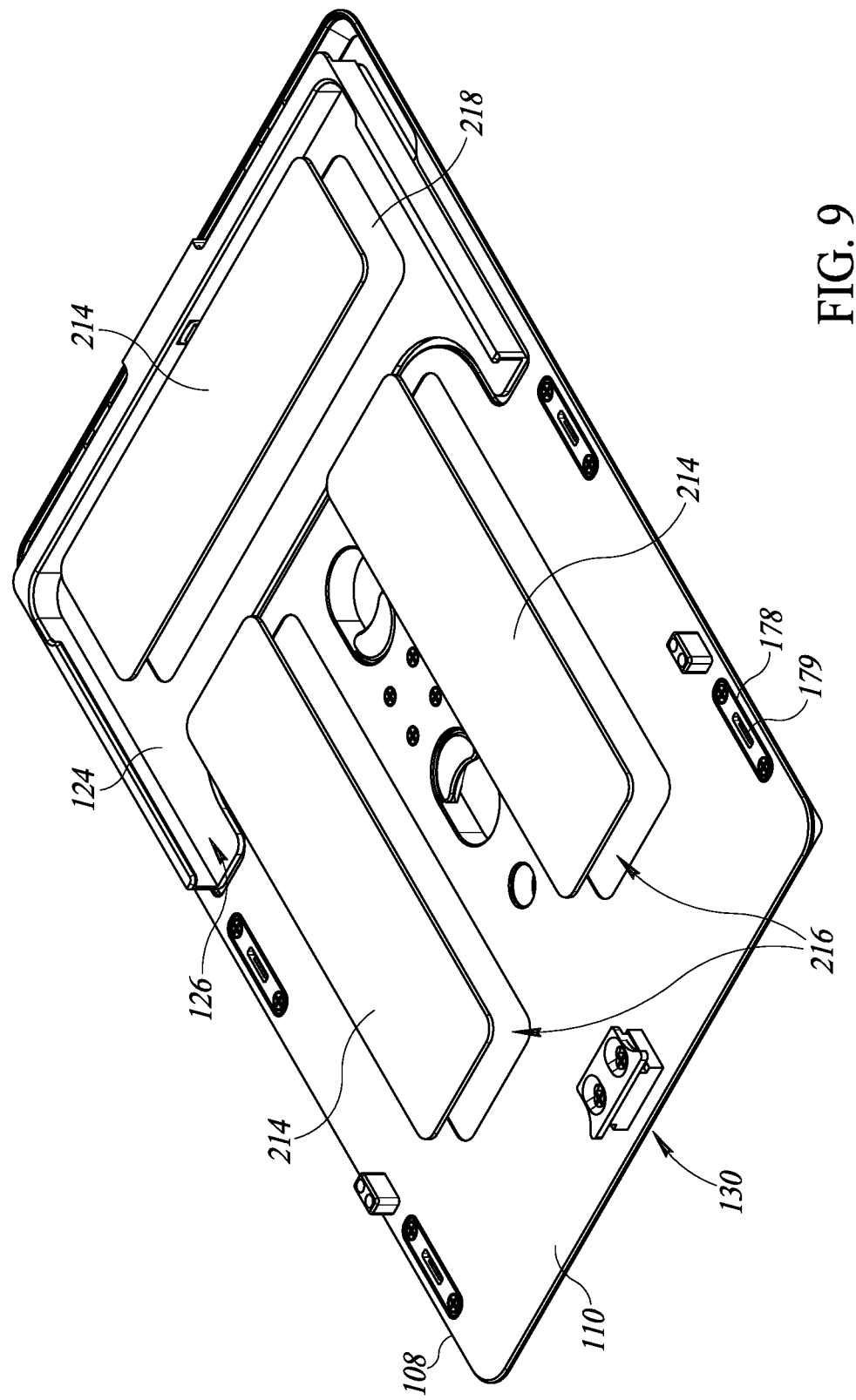
FIG. 9 is a partially exploded perspective view of a portion of the PED holder, showing installation of cover or slide pads onto a surface of the PED holder, according to one illustrated implementation.

FIG. 8 is a partially exploded perspective view of a portion of the PED holder 100, showing assembly of the slide latch assembly 130 of the PED holder. The slide latch assembly 130 includes a slide latch housing 202, a resilient member 204 (e.g., spring), a slide latch 206 having a u-shaped ledge 208, and screws 210. The resilient member 204 is inserted into a pocket (not visible in FIG. 8) of the slide latch housing 202. The resilient member 204 is then compressed with the u-shaped ledge 208 of the slide latch 206. The slide latch 206 is secured to the slide latch housing 202 via the screws 210. As shown in FIGS. 8 and 9, the slide latch assembly 130 is secured to the front side 110 of the unit housing 108 via screws 212. As noted above, the resilient member 204 biases the slide latch 206 toward the center of the unit housing 108, which causes the slide latch to lock the PED 104 into the PED holder 100. To insert the PED 104 into the PED holder 100, or remove the PED therefrom, the user slides the slide latch 206 away from the center of the unit housing 108 to allow sufficient clearance to insert or remove the PED.

FIG. 9 is a partially exploded perspective view of a portion of the PED holder, showing installation of cover or slide pads 214 onto surfaces 216 of the PED holder and a surface 218 on the pocket 126 of the cradle 124. The cover or slide pads 214 may have an adhesive backing, which allows the pads to be adhered to the surfaces 216 of the unit housing 108 and the pocket 126 of the cradle 124.

Figure 10:
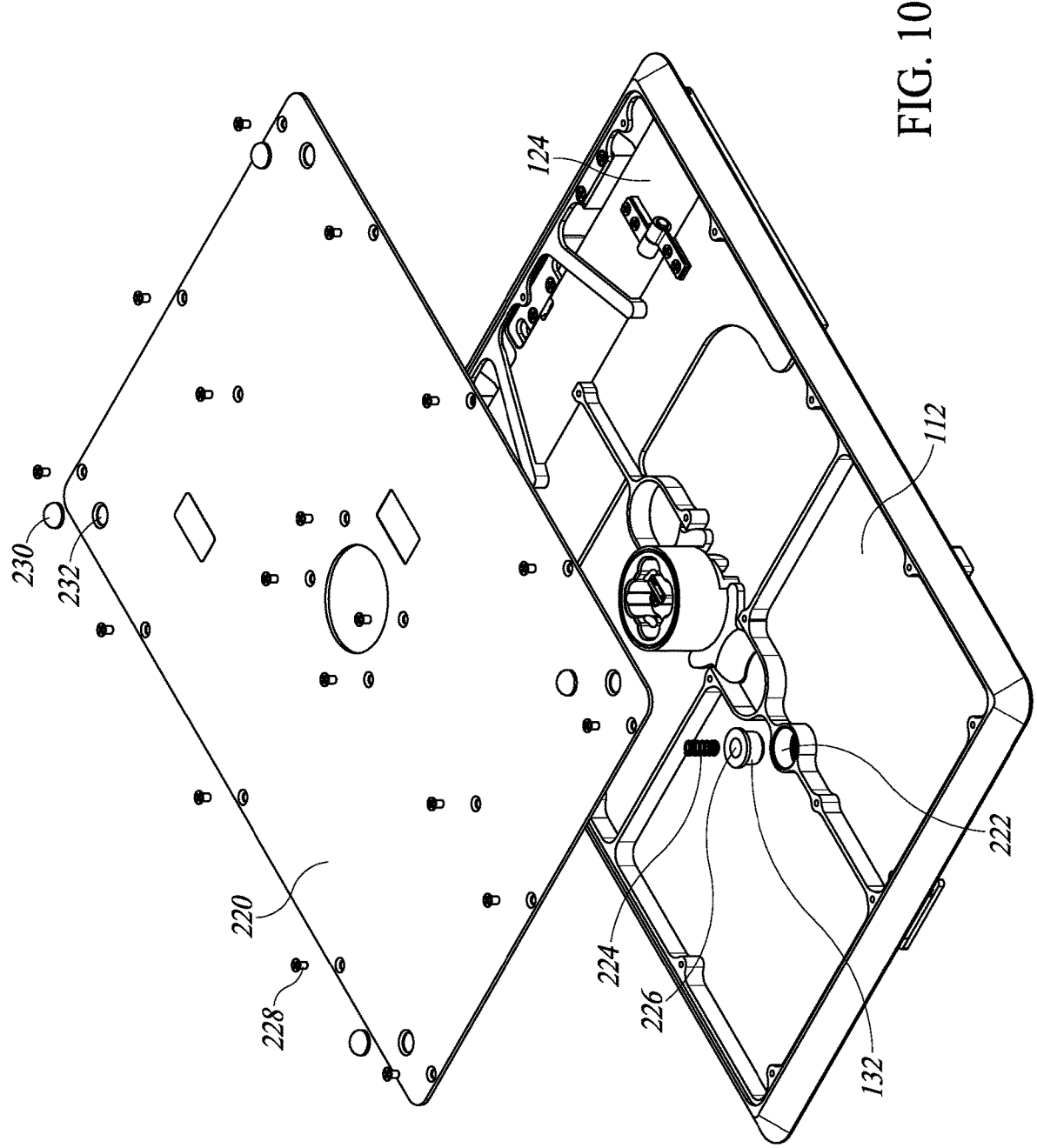
FIG. 10 is a partially exploded perspective view of a portion of the PED holder, showing installation of an eject pin and a rear cover of the PED holder, according to one illustrated implementation.

FIG. 10 is a partially exploded perspective view of a portion of the PED holder 100, showing assembly of the eject pin 132 and a rear cover 220 of the PED holder. The eject pin 132 may be inserted into an aperture 222 that extends through the unit housing 108 from the rear side 112 of the unit housing. A resilient member 224 (e.g., spring) may be inserted into a pocket 226 positioned on a rear side of the eject pin 132. The rear cover 220 may be secured to the rear side of the unit housing 108 using a plurality of screws 228, for example. A plurality of domed bumpers 230

(e.g., polyurethane bumpers) may be applied to a corresponding plurality of bumper seats 232 positioned on the rear cover 220. As an example, each of the domed bumpers 230 may be adhered to a bumper seat 232 via a suitable adhesive.

As discussed above, the eject pin 132 may be biased outwardly toward the front side of the unit housing 108 by the resilient member 224 so that when the slide latch assembly 130 is moved from the locked position to the unlocked position, the eject pin 132 exerts a force on a rear side of the PED 104 that causes the PED and the cradle assembly 124 to pivot forward toward the user to allow the user to grasp and remove the PED from the PED holder 100.

Figure 11:
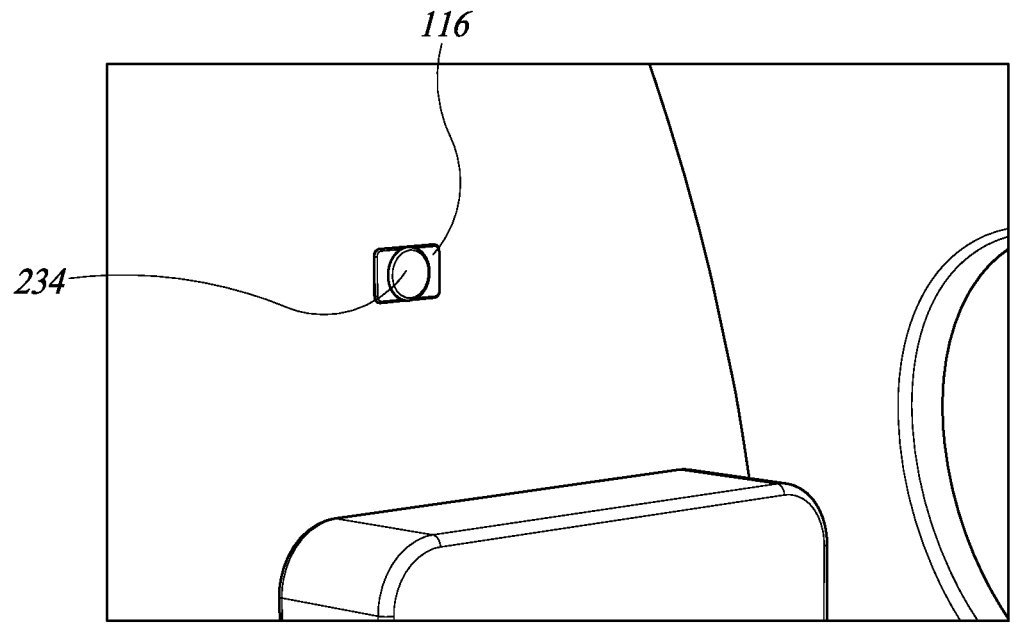
FIG. 11 is a perspective view of a docking base of the wall mount system attached to a wall of an aircraft cabin, shown with a removable cover positioned over a port of the docking base, according to one illustrated implementation.
Figure 12:
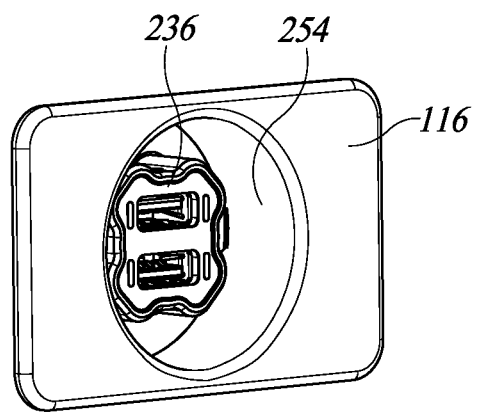
FIG. 12 is an enlarged view of the docking base shown in FIG. 11 with the cover thereof removed, according to one illustrated implementation.
Figure 13:
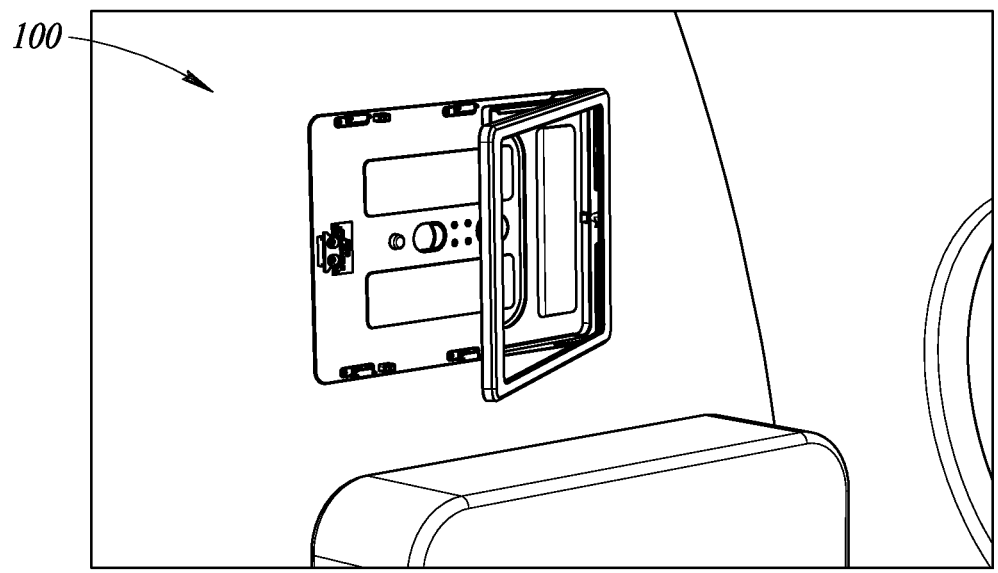
FIG. 13 is a perspective view of the PED holder secured to the docking base of FIG. 12, shown with the bezel of the wall mount system in the opened position, according to one illustrated implementation.
Figure 14:
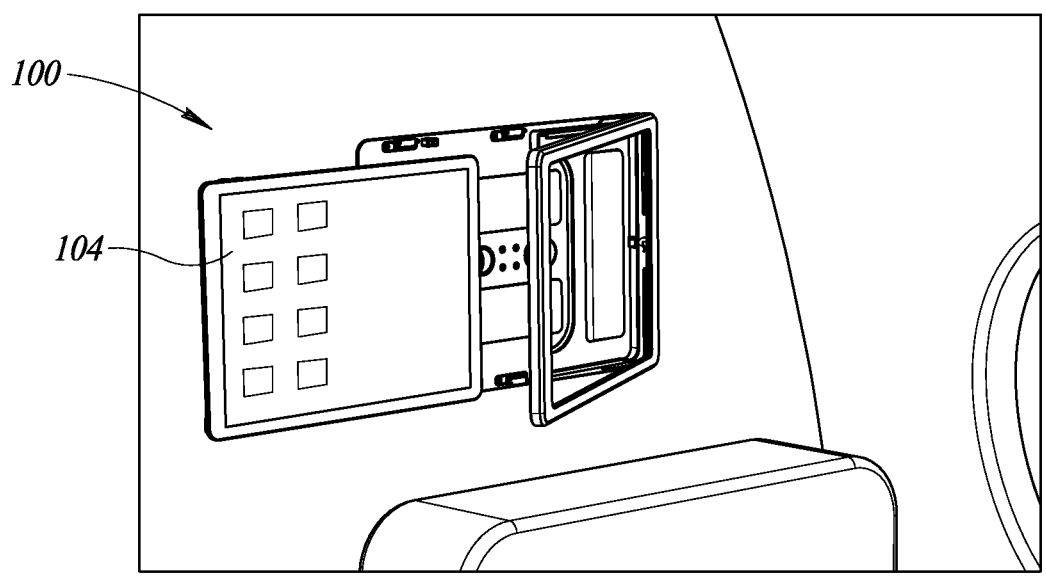
FIG. 14 is a perspective view of the PED holder secured to the docking base of FIG. 12, shown with a PED positioned to be received by the PED holder, according to one illustrated implementation.
Figure 15:
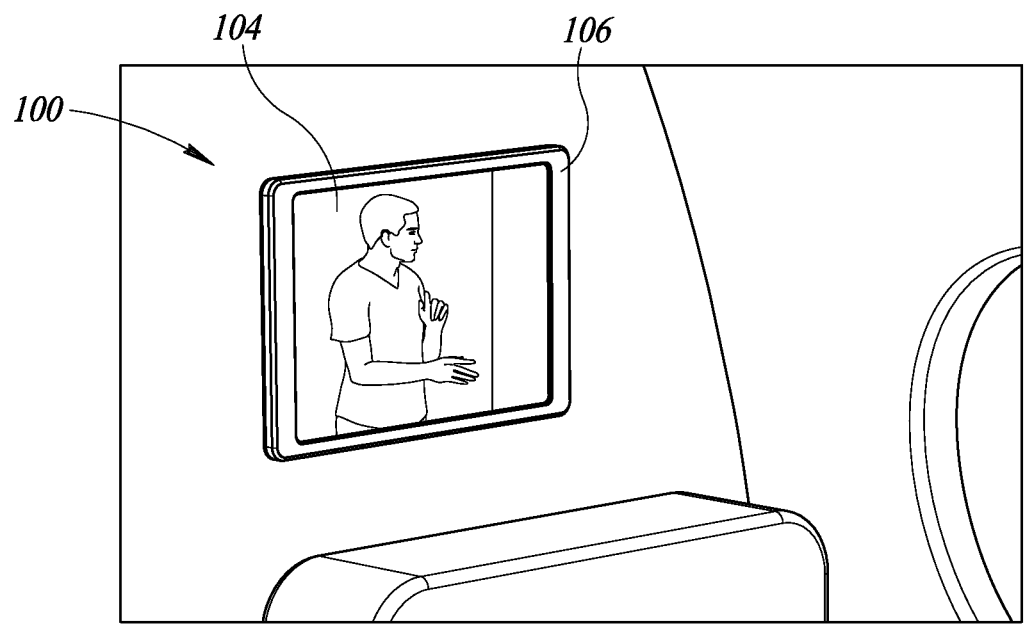
FIG. 15 is a perspective view of the PED holder secured to the docking base of FIG. 12, shown with a PED received by the PED holder, according to one illustrated implementation.
Figure 16:
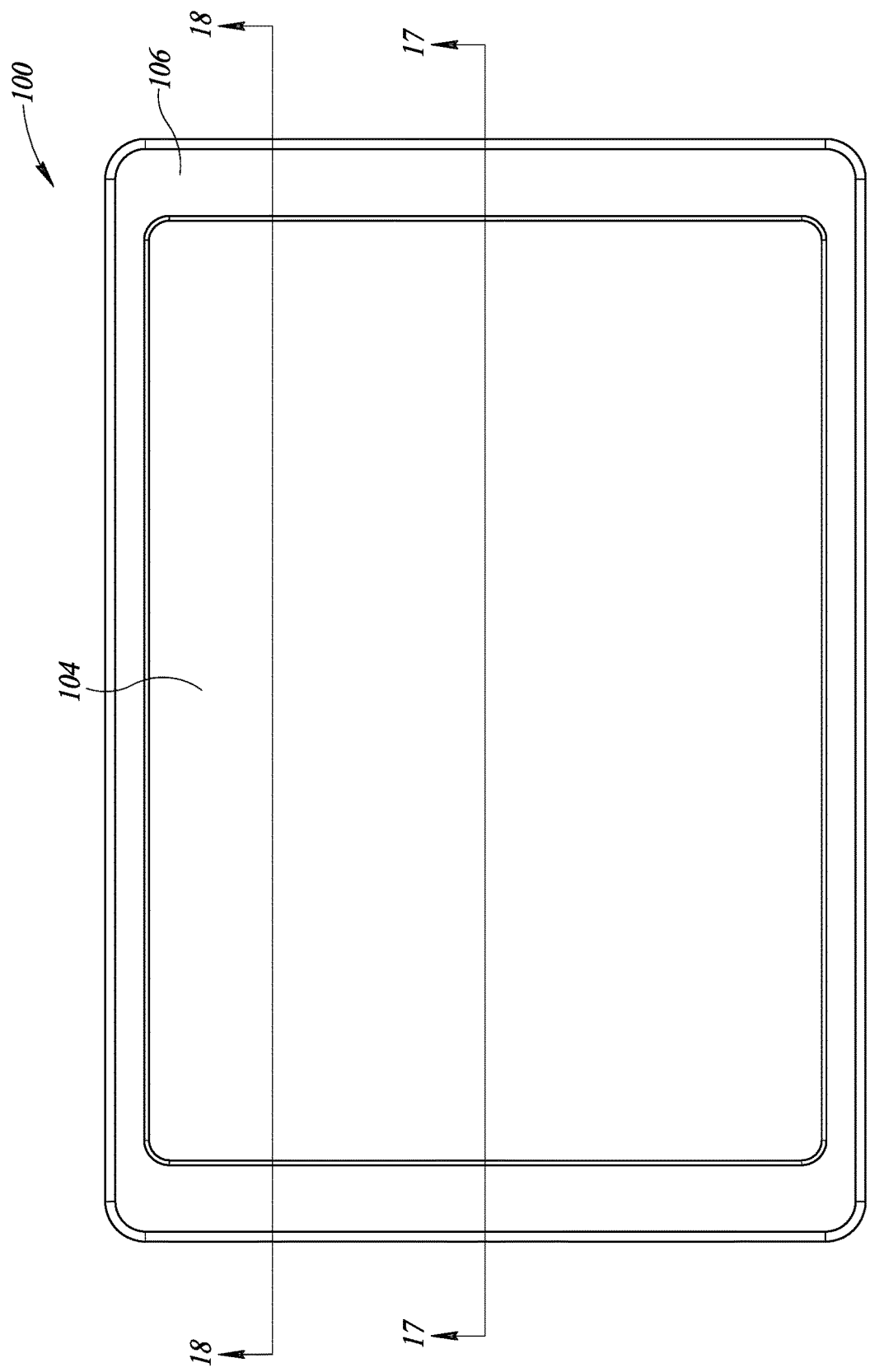
FIG. 16 is a top plan view of the PED holder shown with a PED received therein, according to one illustrated implementation.

FIGS. 11 and 12 show the docking base 116 of the wall mount system 102, showing the docking base with a cover 234 (FIG. 11) and without a cover (FIG. 12). When the cover 234 is removed as shown in FIG. 12, a docking base connector 236 is exposed. In the illustrated example, the docking base connector 236 comprises two USB® connectors that are each operative to provide power and/or facilitate data transfer. The docking base connector 236 is operative to selectively engage with the one or more connectors 142 of the quick release connector 114 to provide mechanical and electrical coupling between the docking base 116 and the quick release connector 114. FIG. 13 shows the PED holder 100 removably mounted on the docking base 116, with the bezel 106 of the wall mount system 102 in the opened position. FIG. 14 shows the PED holder 100 secured to the docking base 116 with the PED 104 positioned to be received by the PED holder. FIG. 15 shows the PED holder 100 secured to the docking base 116, with the PED 104 received by the PED holder and the bezel 106 in the closed position.

FIGS. 17A-B and 20A-B illustrate the operation of the quick release connector 114. The PED holder 100 is secured to a surface, such as a surface in an airplane cabin, by engaging the quick release connector 114 with the docking base 116, as discussed below. The surface may be, for example, an arm of a chair, a table, or a bulkhead or sidewall of an aircraft. In such implementations, the docking base 116 is attached to the surface using one or more registration features, such as screws and nuts, or bolts, for example. The PED holder 100 is then removably attached to the docking base 116 using a releasable registration feature that, as discussed below, allows for the PED holder to be quickly and efficiently removed from the docking base. Alternatively, the docking base 116 may be installed on a surface located in some other type of vehicle or environment, such as, for example, the interior of a truck cabin or a ship cabin, or like environments with limited physical space.

The release slide 118 of the quick release connector 114 has a substantially cylindrical shape with a bottom end 250 that is inserted into the docking base 116 and a top end 252 opposite the bottom end that extends upward (as shown) and outward away from a central axis defined by the cylindrical shape of the release slide 118. The central axis for the release slide 118 runs from the bottom end 250 towards the top end 252 of the release slide. In some implementations, the release slide 118 may have a different shape, such as oval or square. The docking base 116 includes an outer wall 254 and an inner wall 256, and is sized and shaped to receive at least a portion of the release slide 118.

The release slide 118 has the interior opening 154 that is sized and shaped to accept the latch base 134, as discussed above. The latch base 134 is substantially cylindrical with a central axis that runs within the center of the latch base. The latch base 134 has an outer radius that is slightly less than the radius of the interior opening 154 of the release slide 118.

As discussed above, the bottom end 162 of the latch base 134 includes the one or more electrical connectors 142 that connect the docking base 116 and the PED 104. The docking base 116 may be operatively coupled to one or more power supplies and/or one or more processor-based devices (e.g., CMS). The one or more connectors 142 located in the bottom end of the latch base 134 may be, for example, one or more USB type ports that receive a USB connector 236 (FIG. 12) attached to the docking base 116. As shown in FIG. 17B, the bottom end 162 of the latch base 134 may be at least partially covered by the release slide 118. The docking base 116 has the one or more electrical connectors 236 or ports, such as USB ports, that correspond to the connectors 142 at the bottom end 162 of the latch base 134. Accordingly, the electrical connectors 236 from the docking base 116 may be aligned and engaged with the corresponding electrical connectors 142 on the latch base 134, thus creating an electrical connection between the docking base 116 and the latch base 134 that allows electrical signals (e.g., power, data) to be transmitted between the docking base and the PED holder 100. The electrical signals may carry data, thus allowing, for example, digital content to be transmitted from a source (e.g., CMS) to the PED holder 100. Optionally, the electrical signals may be used to provide power to devices attached to the PED holder 100.

Figure 17A:
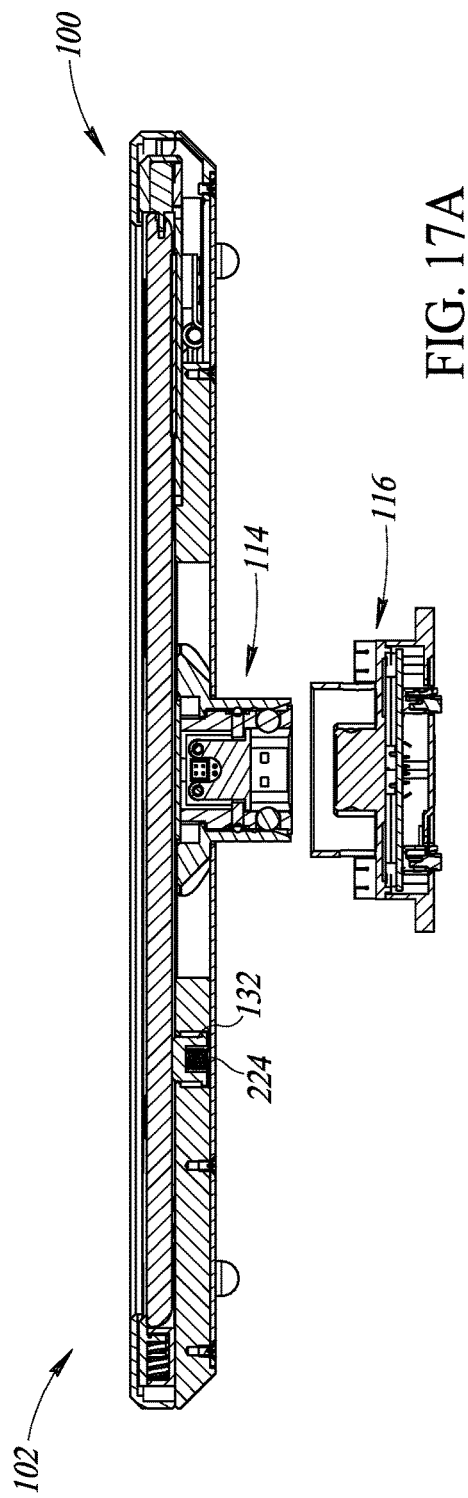
FIG. 17A is a sectional view of the PED holder taken along the line A-A of FIG. 16, according to one illustrated implementation.
Figure 17B:
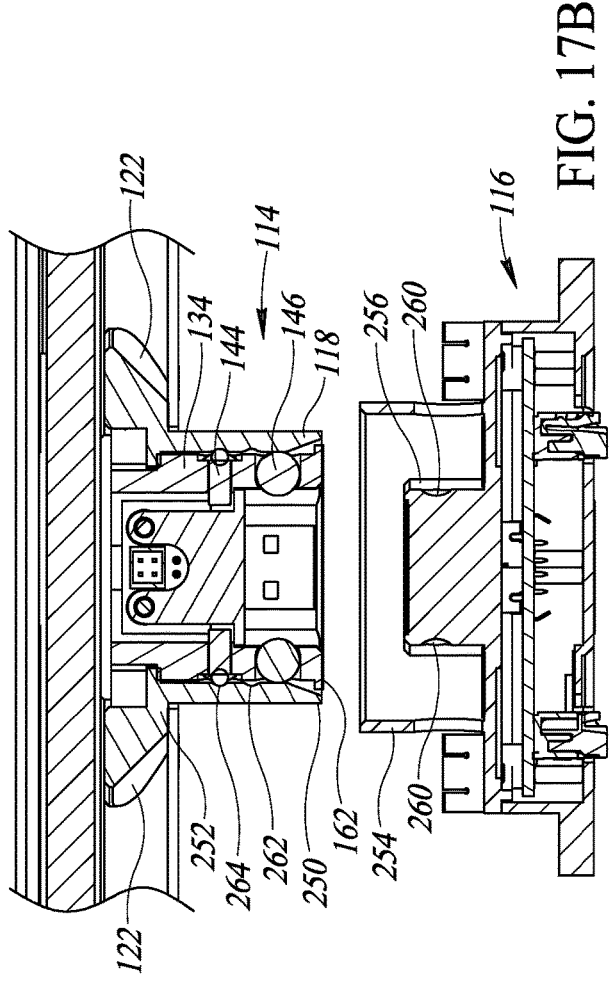
FIG. 17B is an enlarged portion of the view of FIG. 17A, according to one illustrated implementation.
Figure 20A:
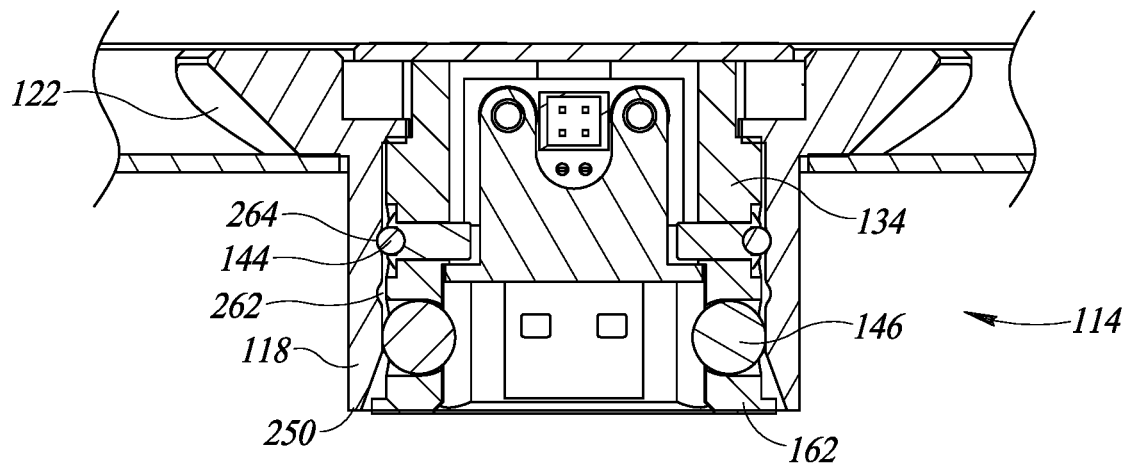
FIG. 20A is a sectional view of the quick release connector of the PED holder, shown when the quick release connector is in a locked position, according to one illustrated implementation.

As shown in FIGS. 17A-B and 20A-B, the latch base 134 includes the set of contact ball bearings 146 (see FIG. 4) and the set of release ball bearings 144 located above the set of contact ball bearings 146. The docking base 116 has a set of detents 260 on the interior wall 256 that correspond to the set of contact ball bearings 146. When the latch base 134 is engaged with and connected to the docking base 116, at least a portion of each contact ball bearing 146 is engaged with a corresponding detent 260 within the docking base 116. In FIGS. 17A-B and 20A, the release slide 118 is in the "pushed in" or locked position, which provides an inward force on each contact ball bearing 146 to keep the contact ball bearings 146 engaged with the corresponding detents 260. The engagement between the contact ball bearings 146 and the detents 260 keeps the latch base 134, and thus the PED holder 100, connected to the docking base 116.

Figure 20B:
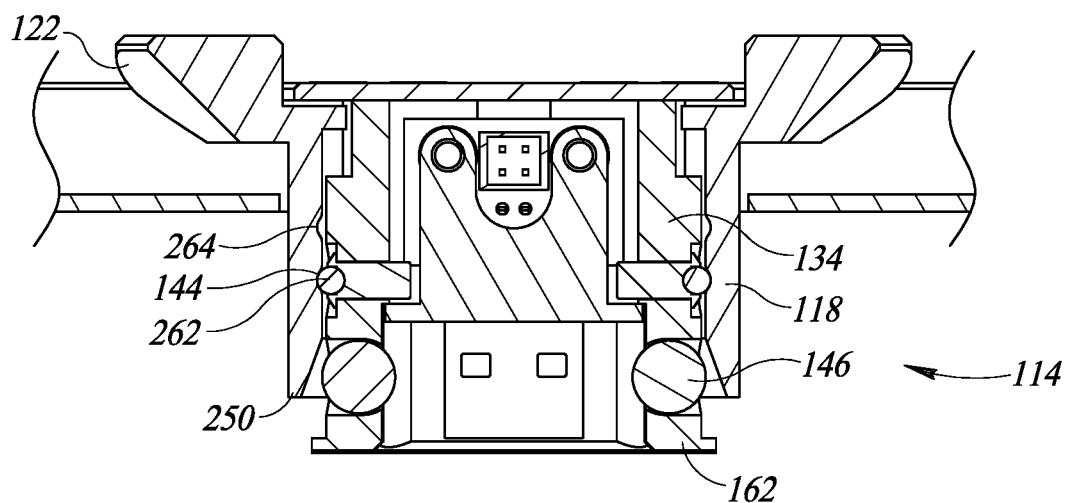
FIG. 20B is a sectional view of the quick release connector of the PED holder, shown when the quick release connector is in an unlocked position, according to one illustrated implementation.

In FIG. 20B, the quick release connector 114 is shown in the "pulled out" or unlocked position, wherein the latch base 134 may be disengaged from the docking base 116. To disconnect the latch base 134, the release slide 118 is pulled toward the user (upward as shown in FIG. 20B) by the grasp portions 122, which removes the inward force being applied to the contact ball bearings 146 and thus allows the contact ball bearings 146 to disengage from the corresponding detents 260. Once the contact ball bearings 146 are disengaged from the detents 260, the latch base 134 can be quickly and easily removed from the docking base 116.

The release slide 118 includes a first set of release slide detents 262 and a second set of release slide detents 264 that engage with the release ball bearings 144. When the release slide 118 is in the unlocked position (FIG. 20B), the first set of release slide detents 262 engages with the release ball bearings 144 to maintain the release slide 118 in the unlocked position. When the release slide 118 is in the locked position (FIGS. 17A-B and 20A, the second set of release slide detents 264 engage with the release ball bearings 144 to maintain the release slide 118 in the locked position.

FIGS. 9, 18, and 19 illustrate the operation of the removable bezel 106. As shown in FIGS. 6 and 19, the bezel 106 is removably coupled to the unit housing 108 via two slot hinges 182 (see FIG. 5) that are fixedly coupled to the unit housing. As shown in FIG. 9 and discussed above, the front side 110 of the unit housing 108 includes the four bezel latch strike plates 178, two spaced apart along the top edge 164 of the front side 110 of the unit housing 108, and two spaced apart along the bottom edge 166 of the front side of the unit housing. Each of the bezel latch strike plates 178 includes an aperture 179 therein that removably receives one of four bezel latches 186 (see FIG. 19) disposed on the bezel 106 at locations that correspond to the bezel latch strike plates 178. As shown in FIG. 18, to unlock the bezel 106, the user may slide the bezel relative to the unit housing 108 from right to left (as shown), which causes the four bezel latches 186 to unlock from the respective bezel latch strike plates 178, and allows the bezel 106 to rotate about the slot hinges 182 as shown in FIG. 19. In at least some implementations, the bezel 106 may be removable from the slot hinges 182 by applying extra rotational force. Such feature allows for replacement of the bezel 106 with another bezel, such as another bezel that has a more desirable color or finish for a particular application.

FIGS. 26A-26F are various views of a docking base 2600 of a wall mount system, and FIGS. 27A-27F are various views of a personal electronics device (PED) holder 2700 of a wall mount system for a PED or display panel. The docking base 2600 and the PED holder 2700 may include some or all of the features of the docking bases and PED holders, respectively, described elsewhere herein. Thus, one or more of the features of the docking bases and the PED holders discussed above may not be repeated herein for the sake of brevity.

Figure 26A:
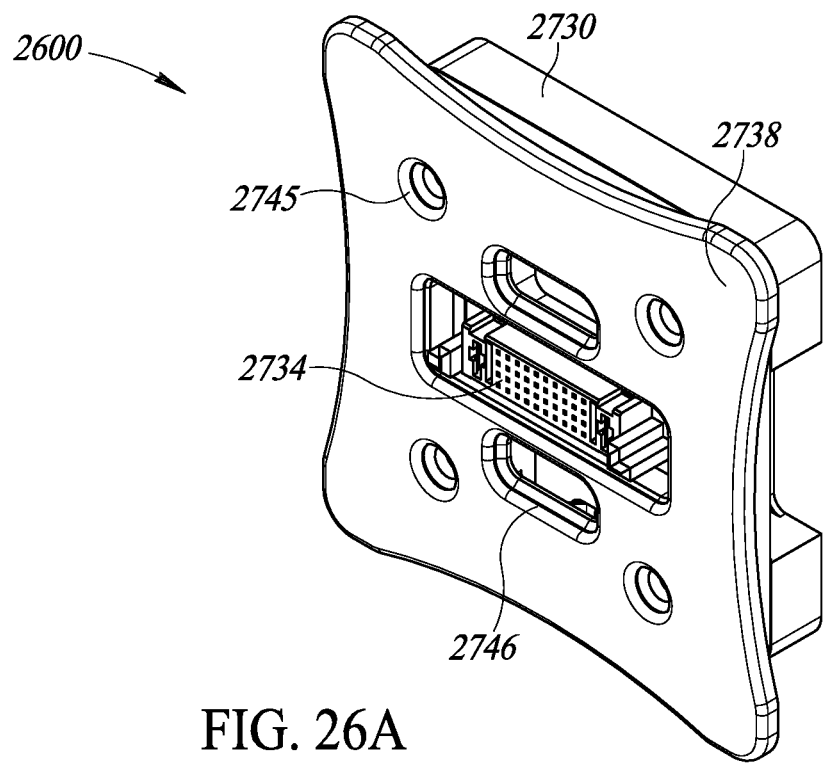
FIGS. 26A-26F are various views of a universal mount of a wall mount system, according to one illustrated implementation.
Figure 26B:
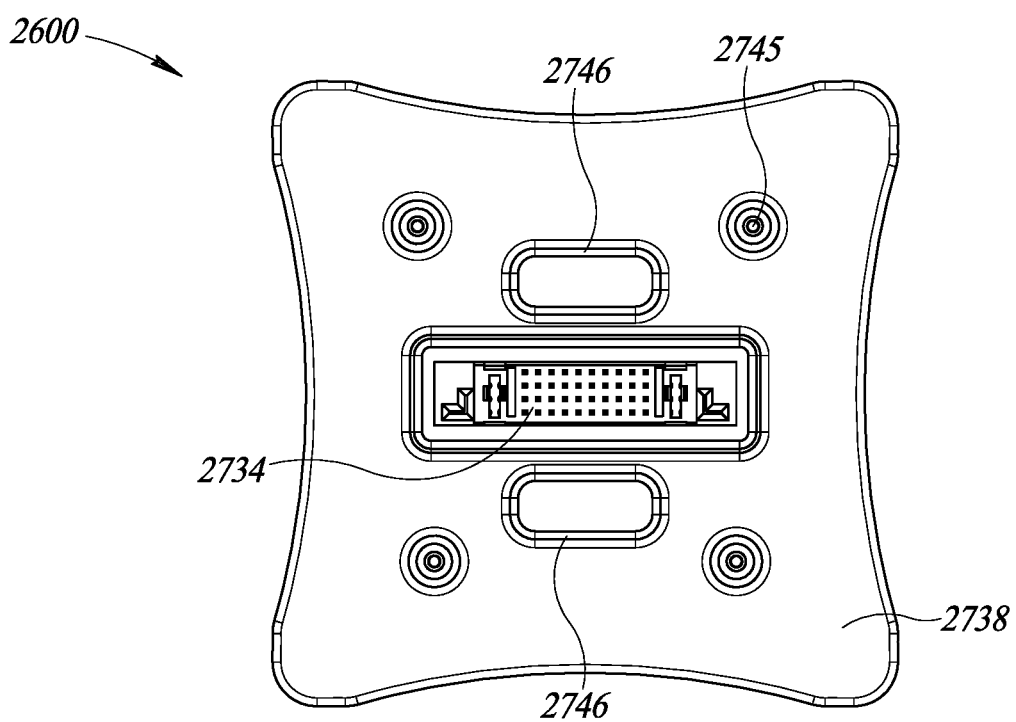
Figure 26C:
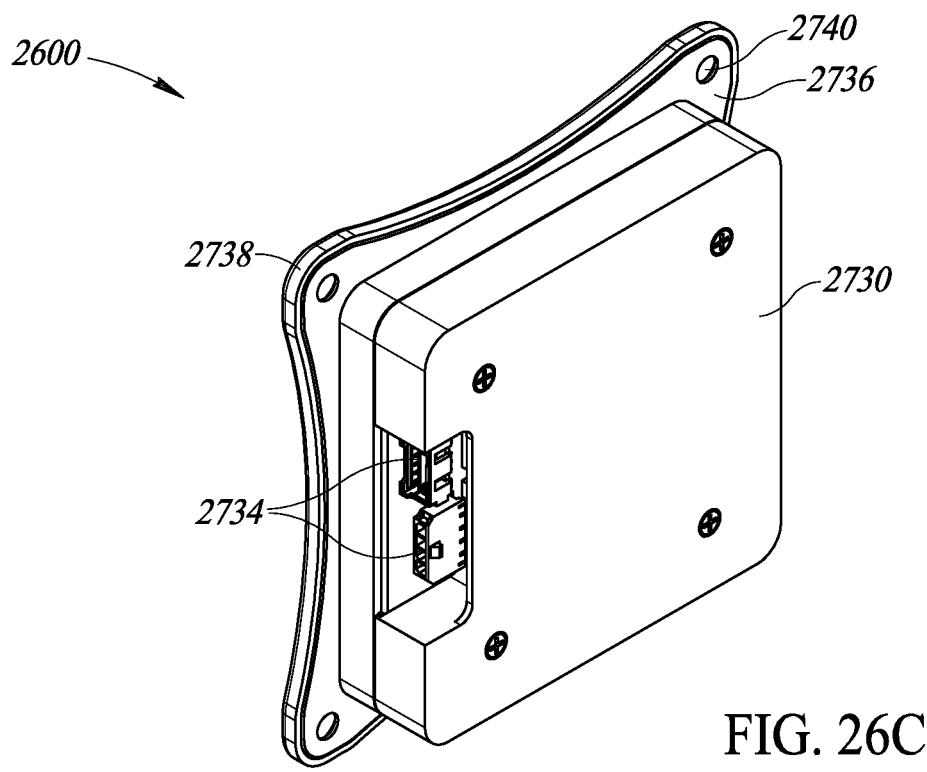
Figure 26D:
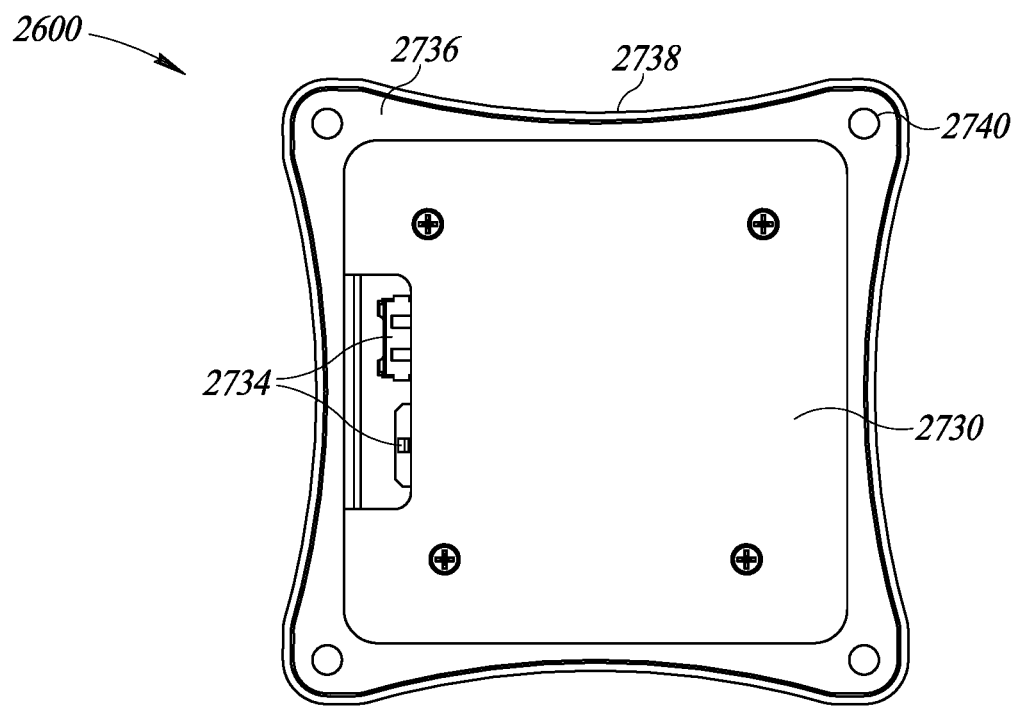
Figure 26E:
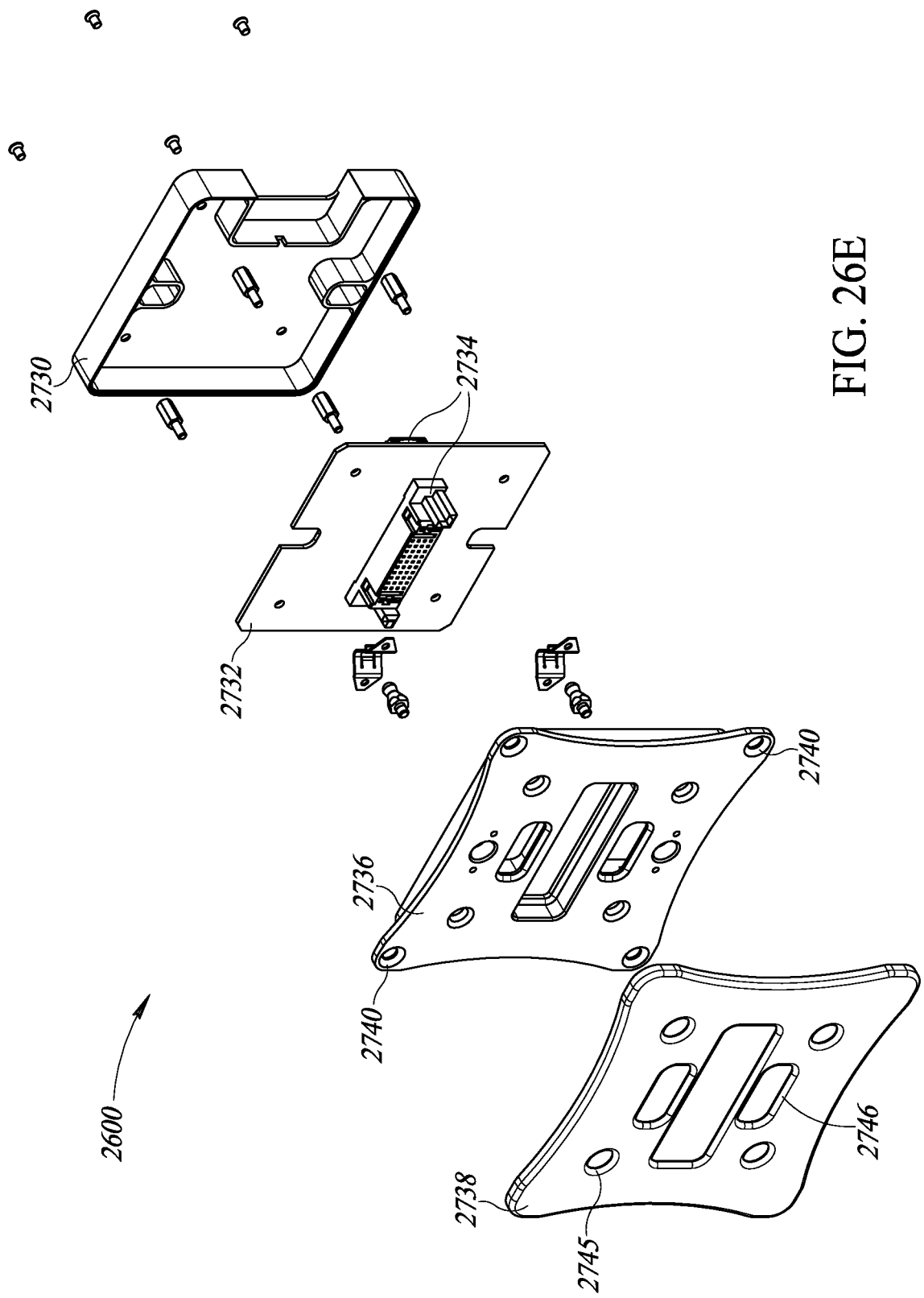
Figure 26F:
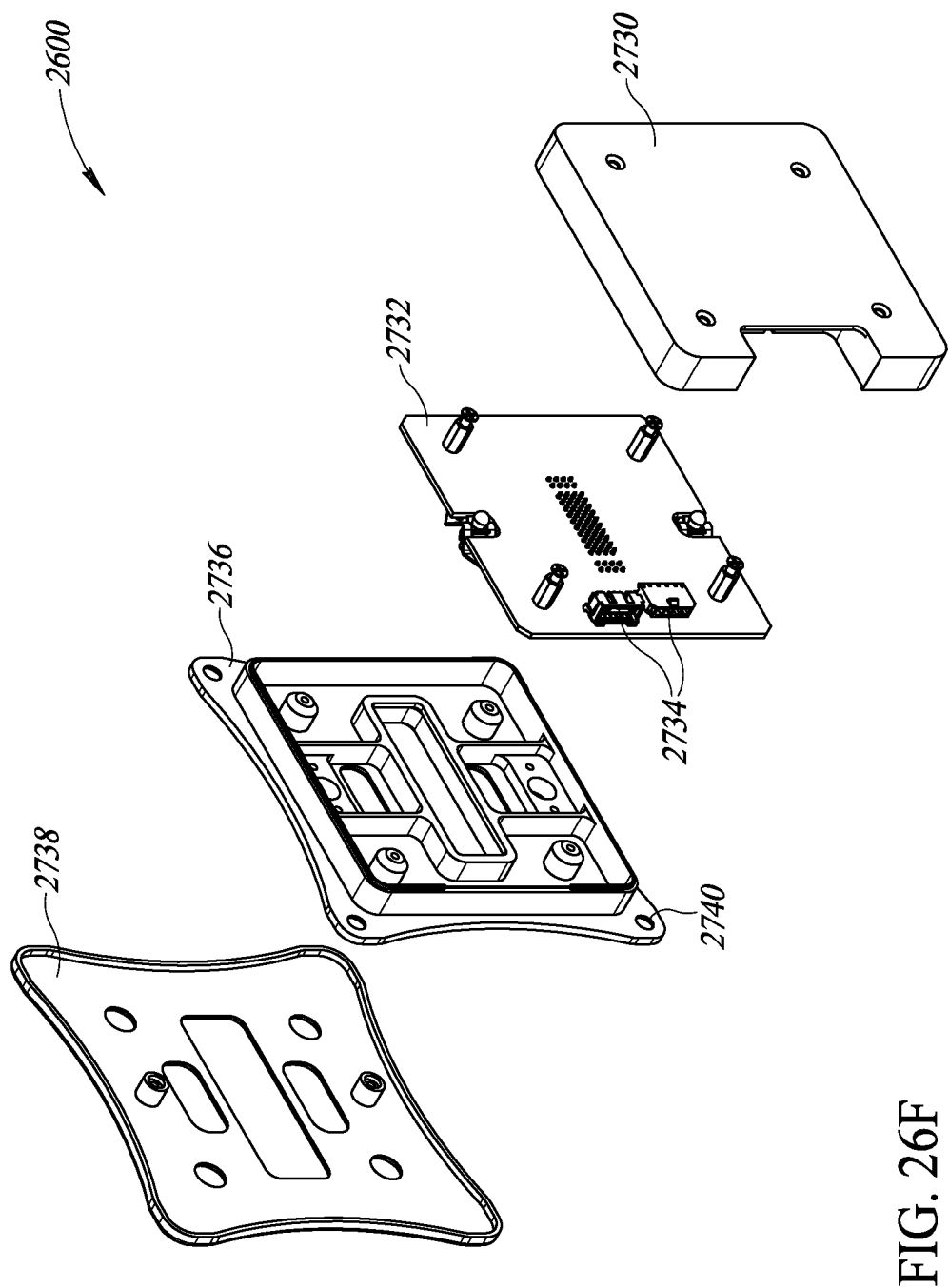

In particular, FIG. 26A is a front isometric view of the docking base 2600. FIG. 26B is a front elevational view of the docking base 2600. FIG. 26C is a rear isometric view of the docking base 2600. FIG. 26D is a rear elevational view of the docking base 2600. FIG. 26E is a front isometric partially exploded view of the docking base 2600. FIG. 26F is a rear isometric partially exploded view of the docking base 2600.

Figure 27A:
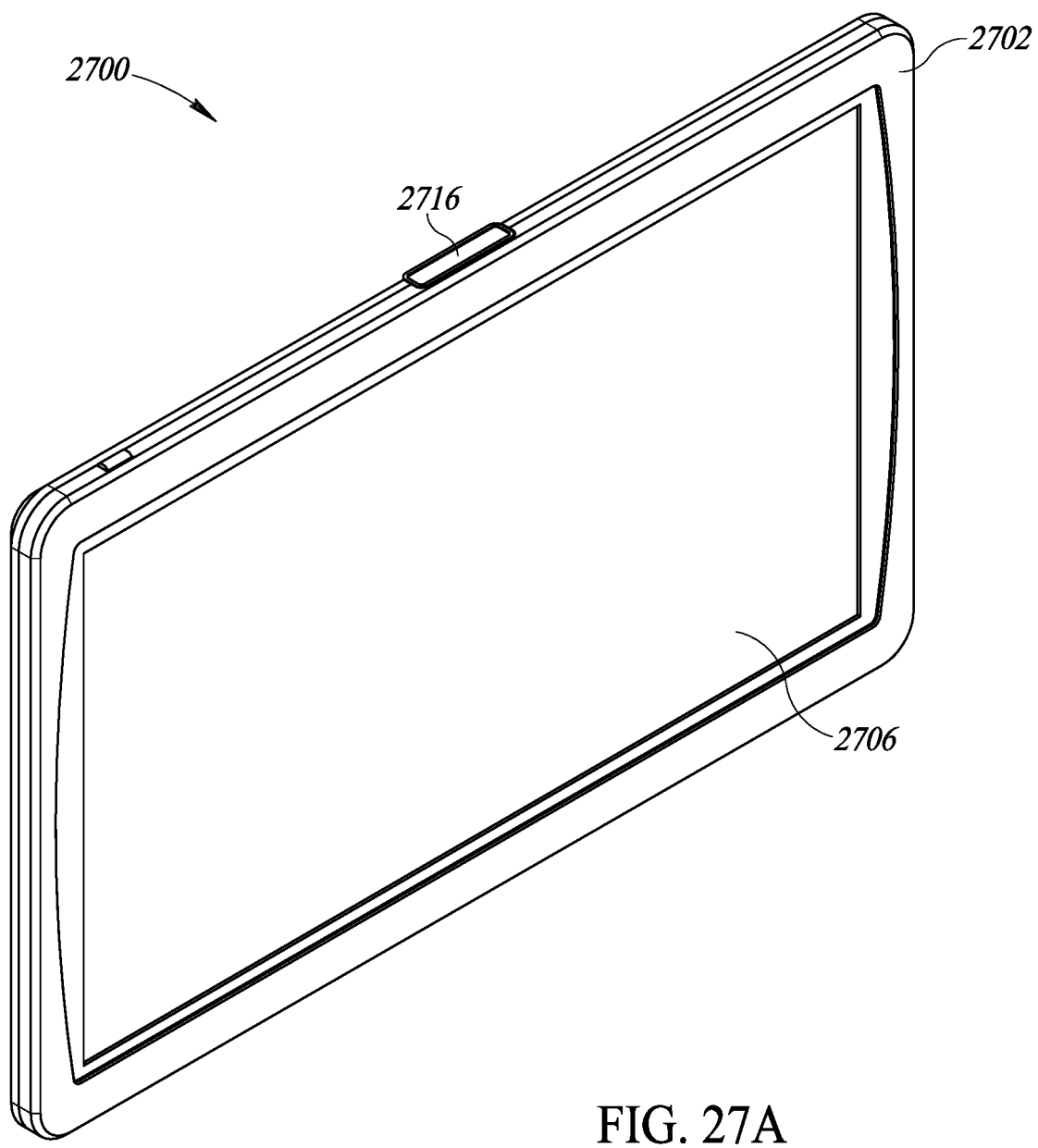
FIGS. 27A-27F are various views of a PED holder of a wall mount system, according to one illustrated implementation.
Figure 27B:
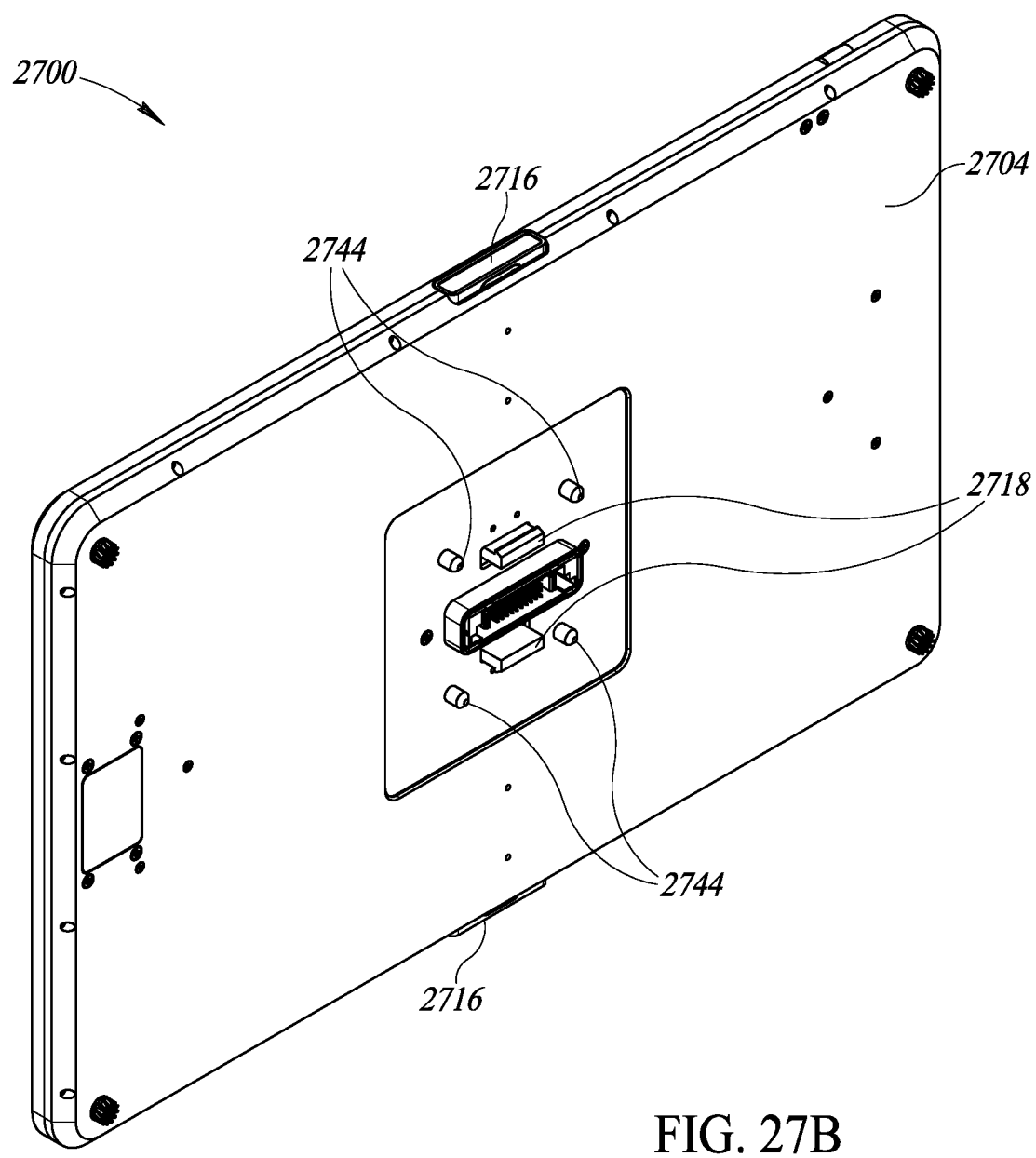
Figure 27C:
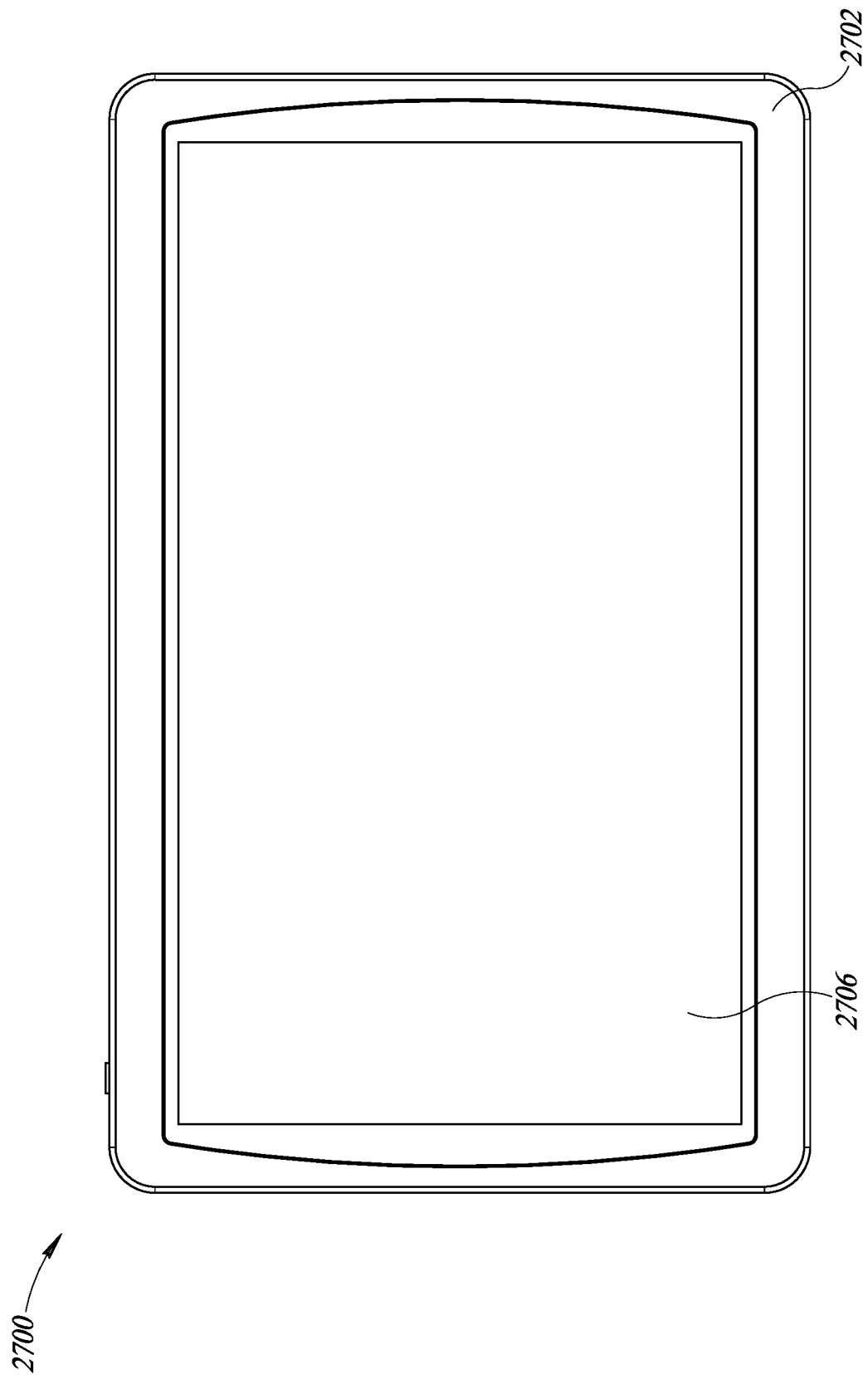
Figure 27D:
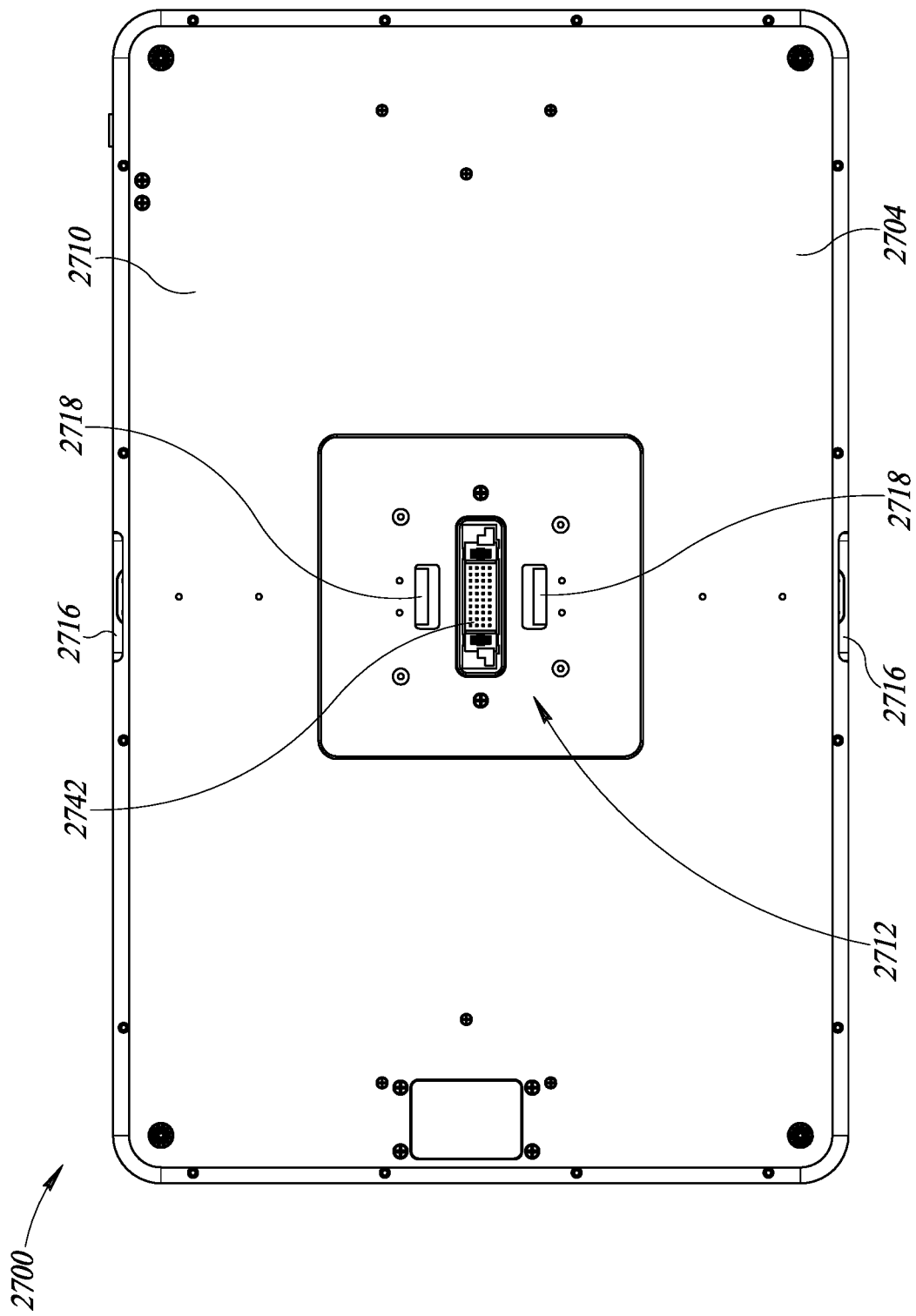
Figures 27E, 27F:
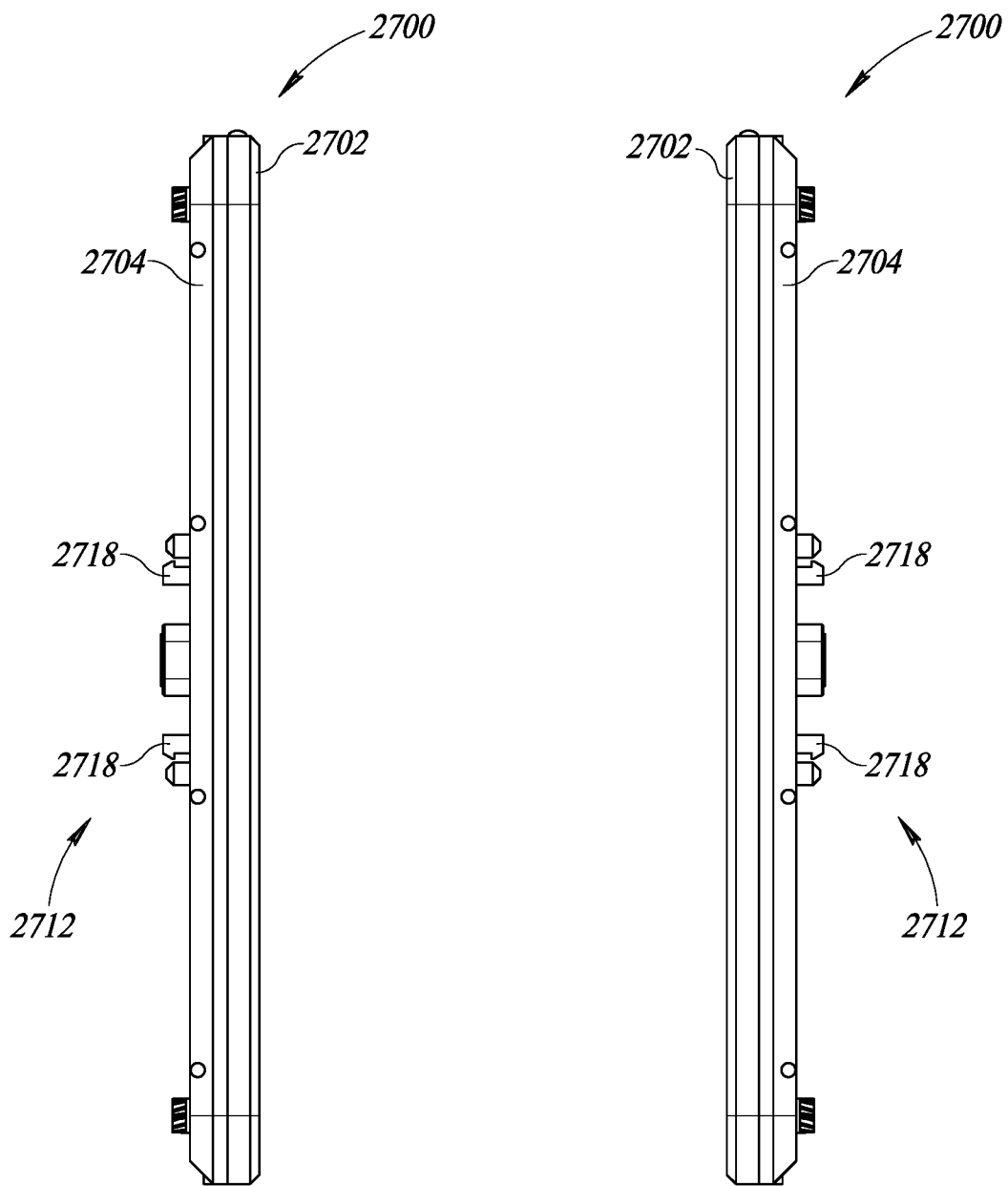
Figure 28A:
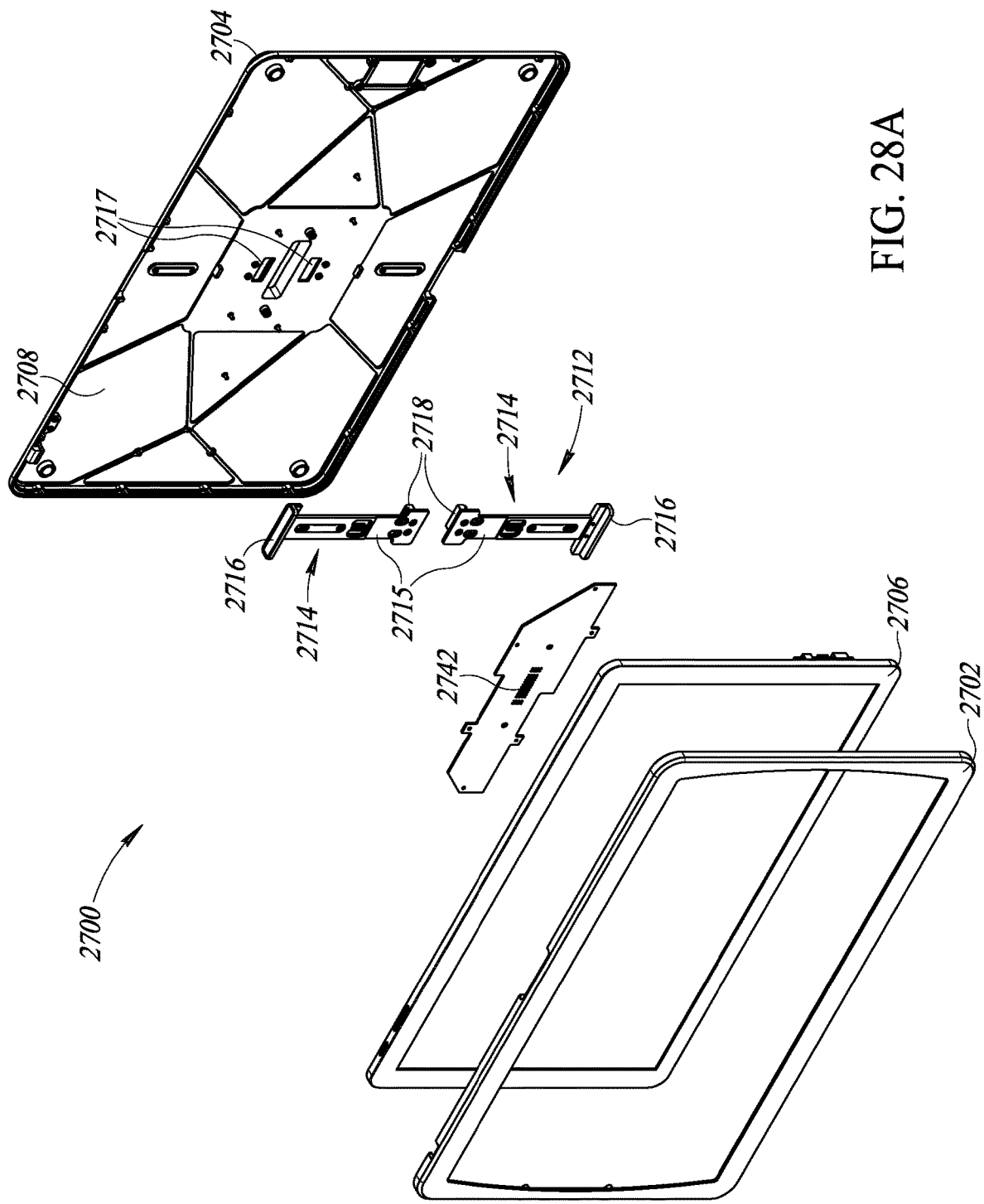
FIG. 28A shows an exploded view of the PED holder of FIGS. 27A-27B, according to one illustrated implementation.
Figure 28B:
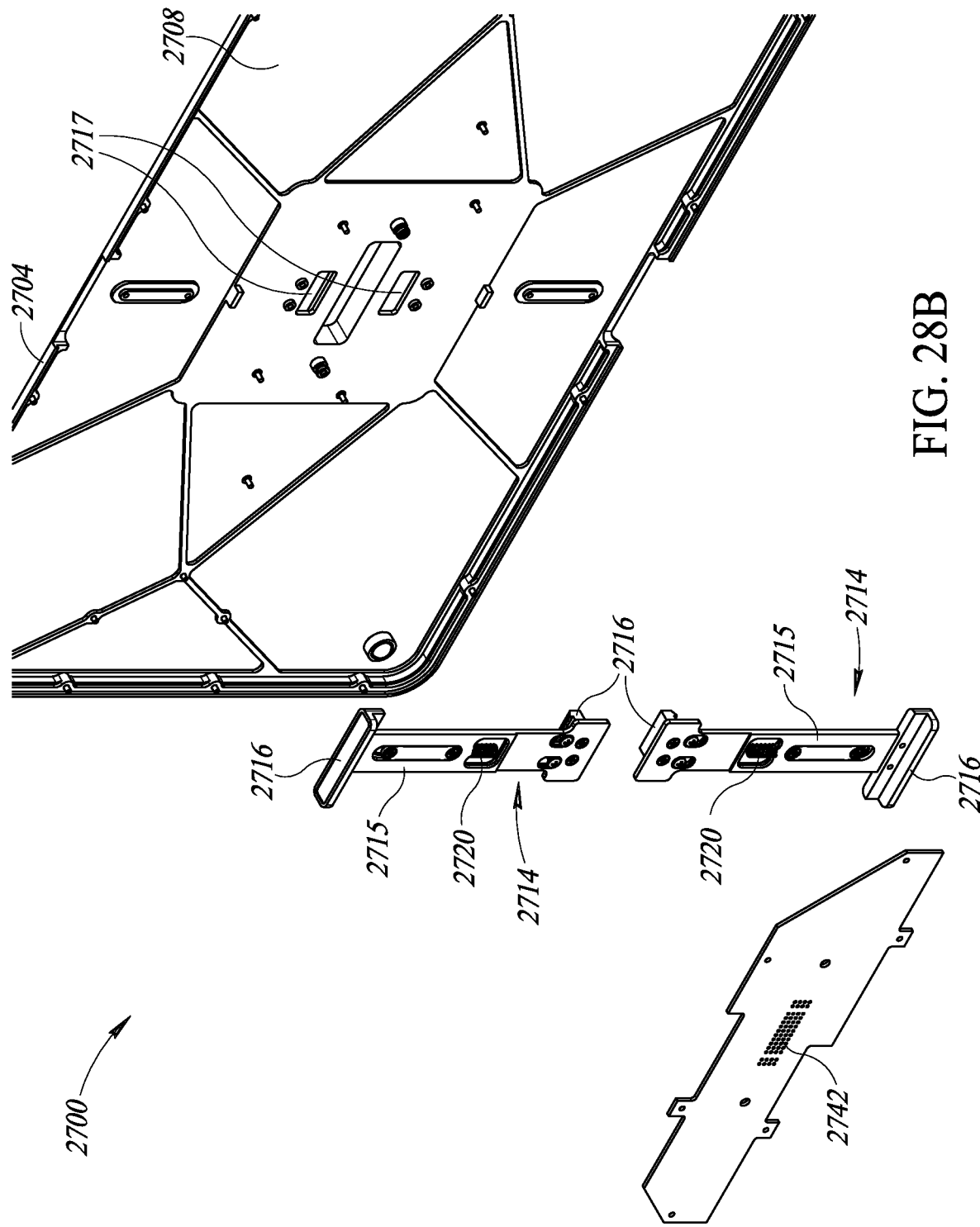
FIG. 28B shows an enlarged portion of the view of the PED holder shown in FIG. 28A, according to one illustrated implementation.

FIG. 27A is a front isometric view of the PED holder 2700. FIG. 27B is a rear isometric view of the PED holder 2700. FIG. 27C is a front elevational view of the PED holder 2700. FIG. 27D is a rear elevational view of the PED holder 2700. FIG. 27E is a left side elevational view of the PED holder 2700. FIG. 27F is a right side elevational view of the PED holder 2700.

In at least some implementations, the docking base 2600 may support PED/displays up to 32 inches or more and weighing up to 20 pounds or more, for example. In at least some implementations, the thickness of the docking base 2600 may be less than 1 inch to permit a variety of installation options. The docking base 2600 may be connected to an aircraft structure using front mounted screws. The docking base 2600 may include an electrical interface which provides power and/or data to the PED holder 2700 which includes or selectively receives a PED/display. In at least some implementations, the docking base 2600 may be used for other non-display purposes. For example, the docking base 2600 may be used with sconce lights or other applications.

The docking base 2600 may operate from 28 VDC aircraft power provided to a connector of the docking base. The docking base 2600 may provide variable output power (e.g., up to 100 W) from a USB Power Delivery Standard or an output selectable DC power supply. The docking base 260 may additionally or alternatively provide standard USB output power. If the USB Power Delivery Standard (e.g., USB PD) is in use, output voltage is controlled by the PED/Display USB interface. If the selectable DC power supply is in use, output power may be set by pin straps on the PED/Display Holder interface, for example. In at least some implementations, the interface may include a pin that enables the power to the display to be shut off remotely (e.g., from the CMS of the aircraft).

The PED holder 2700 provides mechanical and electrical interfaces for mounting the PED/Display to the docking base 2600. The PED holder 2700 may be separate part like the PED holders discussed above, or the PED holder may be integrated with an optionally modified PED/display, as discussed further below.

The PED holder 2700 includes a front cover or bezel 2702, a back cover 2704, and a PED 2706 positioned in between the front cover and the back cover. The PED 2706 may be a commercially available PED or display, a modified commercially available PED or display, or a custom PED or display, for example. The front cover 2702 may be selectively removable, and may be plated with various finishes as desired. The back cover 2704 of the PED holder 2700 includes a front side 2708 and a rear side 2710 opposite the front side.

Figure 30A:
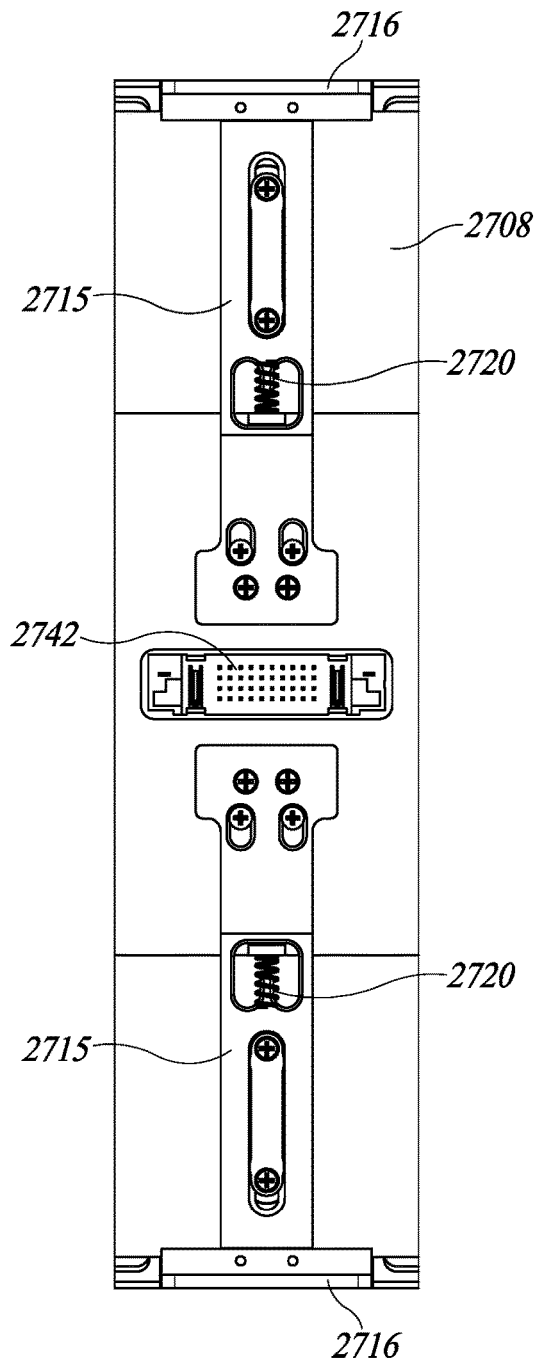
FIG. 30A shows a front elevational view of the latch slide assembly when the latch slide assembly is in a locked position, according to one illustrated implementation.
Figure 30B:
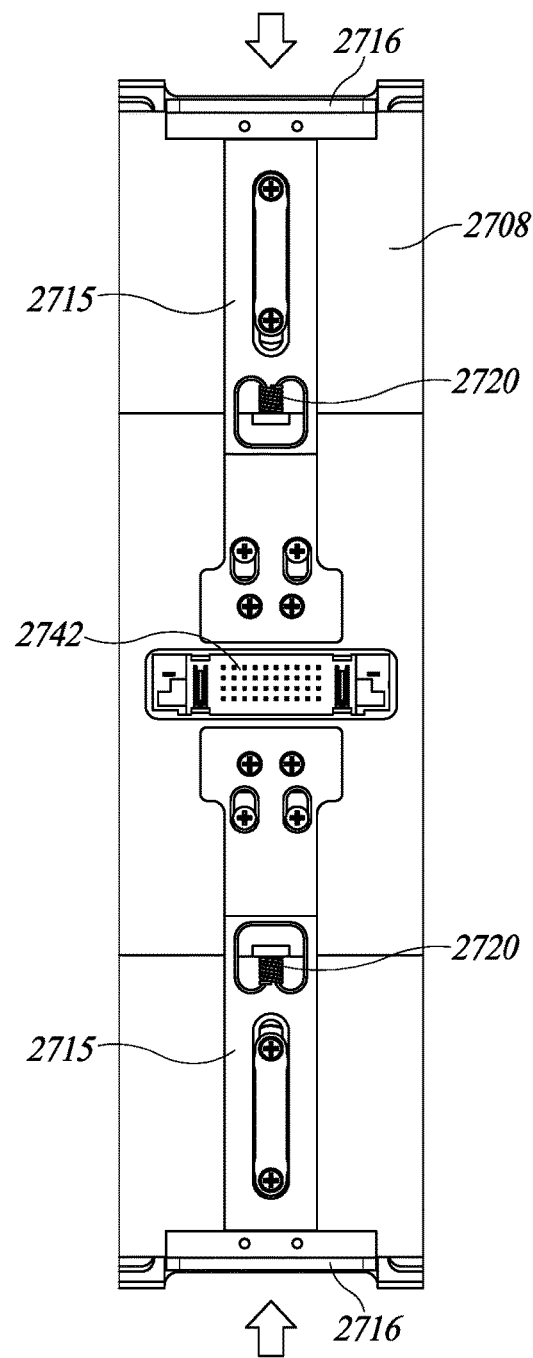
FIG. 30B shows a front elevational view of the latch slide assembly when the latch slide assembly is in an unlocked position, according to one illustrated implementation.
Figure 31B:
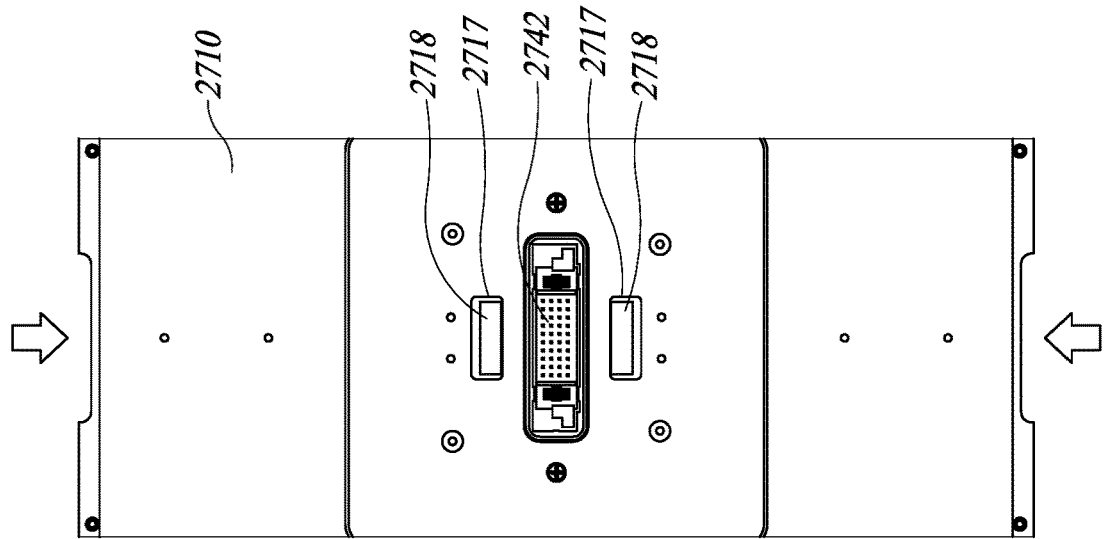
FIG. 31B shows a rear elevational view of the latch slide assembly when the latch slide assembly is in an unlocked position, according to one illustrated implementation.
Figure 31A:
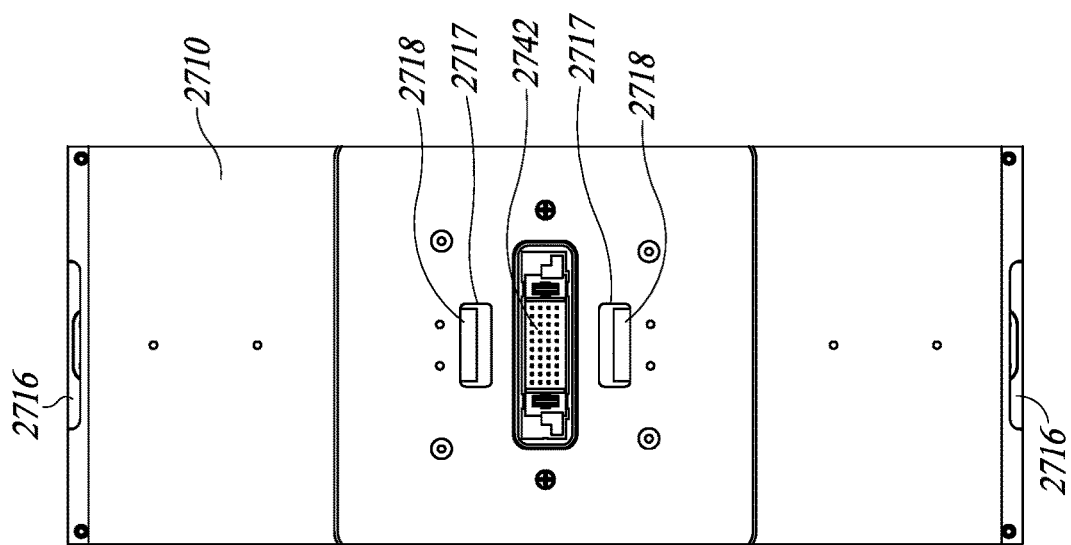
FIG. 31A shows a rear elevational view of the latch slide assembly when the latch slide assembly is in a locked position, according to one illustrated implementation.
Figure 32A:
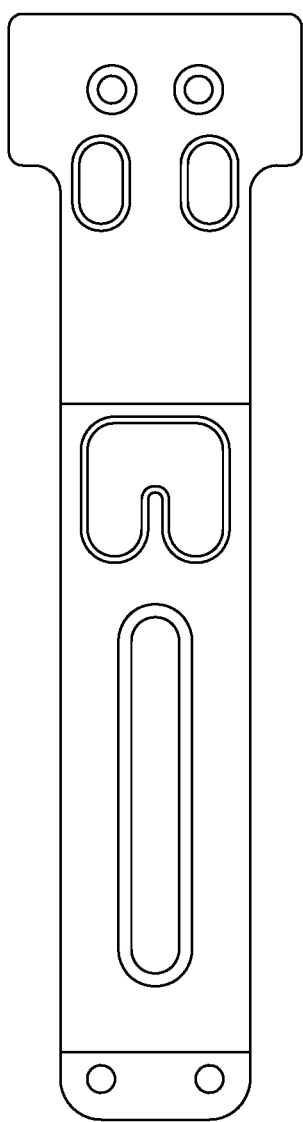
Figure 32B:
Figure 32C:
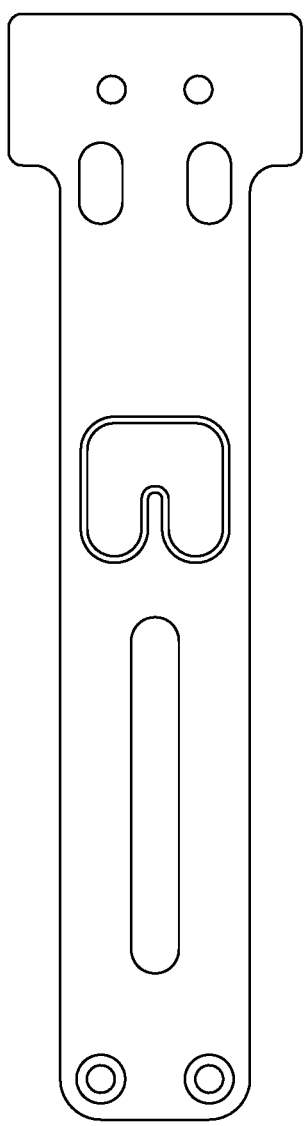

A quick release connector 2712 is coupled to the back cover 2704. As discussed further below, in operation, the quick release connector 2712 selectively attaches to the mount or docking base 2600 to selectively attach the PED holder 2700 to the docking base. The quick release connector 2712 includes latch slide assemblies 2714 comprising latch slides 2715 that are accessible from top and bottom sides of the back cover 2704 via latch buttons 2716. The latch slide assemblies 2714 each include latch hooks 2718 positioned at respective ends of the latch slides 2715 opposite the latch buttons 2716. The latch buttons 2716 allow the latch slides 2715 to be movable by a user between a locked position wherein the latch hooks 2718 of the quick release connector 2712 engage oblong hook receiving apertures or slots 2746 of the docking base 2600 to secure the PED holder 2700 to the docking base, and an unlocked positioned wherein the latch hooks 2718 are removable from the slots 2746 to allow the PED holder to be removed from the docking base. In the example implementation, the latch buttons 2716 may be pushed toward each other to move the respective latch slides 2715 (and latch hooks 2718) into the unlocked position, shown in FIGS. 30B and 31B, and the latch slides may be biased via springs 2720 into the locked position, shown in FIGS. 30A and 31A. In at least some implementations, one of the latch slide assemblies 2714 is sufficient to couple the PED holder 2700 to the docking base 2600, such that the connector 2712 is able to maintain the PED holder coupled to the docking base even if either one of the latch slide assemblies fails or is otherwise not working or connected properly.

The docking base 2600 of the wall mount system includes a back cover 2730, a circuit card 2732 that includes a power supply (not shown) and connectors 2734, a top cover 2736, and a decorative bezel 2738. The power supply may be operative to receive power from an external system (e.g., aircraft power system), and to provide power to a PED/display of the PED holder 2700. As discussed above, the output power may be USB power, USB Power Delivery standard (USB PD) power, selectable DC output power, etc., or any combination thereof. The top cover 2736 includes mounting apertures 2740 sized and dimensioned to receive fasteners (e.g., screws) to mount the docking base 2600 to a structure (e.g., wall of an aircraft cabin). In the illustrated example, the docking base 2600 includes a front connector 2734 that provides power and data to the PED holder 2700 (and to the PED/display 2706) via a corresponding connector 2742, and also provides some mechanical support. The docking base 2600 also includes two connectors 2734 on a rear side of the back cover 2730 that are operative to couple power/data to aircraft power/data systems. The front connector 2734 is operative to selectively engage with the one or more connectors 2742 of the quick release connector 2712 of the PED holder 2700 to provide mechanical and electrical coupling between the docking base 2600 and the quick release connector 2712. The PED holder 2700 may include a number of guide pins or posts 2744 that engage corresponding guide apertures 2745 in the docking base 2600 to provide for alignment and support of the PED holder when the PED holder is coupled to the docking base.

FIGS. 28A-B, 29, 30A-B, and 31A-B illustrate the operation of the quick release connector 2712 to selectively secure the PED holder 2700 to the docking base 2600. The PED holder 2700 is secured to a surface, such as a surface in an airplane cabin, by engaging the quick release connector 2712 with the docking base 2600, as discussed below. The surface may be, for example, an arm of a chair, a table, or a bulkhead or sidewall of an aircraft. In such implementations, the docking base 2600 is attached to the surface using one or more registration features, such as screws and nuts, or bolts, for example, passed through the mounting apertures 2740. The PED holder 2700 is then removably attached to the docking base 2600 using a releasable registration feature that, as discussed below, allows for the PED holder to be quickly and efficiently removed from the docking base. Alternatively, the docking base 2600 may be installed on a surface located in some other type of vehicle or environment, such as, for example, the interior of a truck cabin or a ship cabin, or like environments with limited physical space.

As noted above, the quick release connector 2712 includes a lower latch slide assembly 2714 and an opposing upper latch slide assembly 2714. The lower latch slide assembly 2714 includes a lower latch slide 2715, a lower latch button 2716 coupled to a bottom end of the lower latch slide, a lower latch hook 2718 coupled to a top end of the lower latch slide, and a latch spring 2720 positioned on an interior post 2721 of the lower latch slide. Similarly, the upper latch slide assembly 2714 includes an upper latch slide 2715, an upper latch button 2716 coupled to a top end of the upper latch slide, an upper latch hook 2718 coupled to a bottom end of the upper latch slide, and a latch spring 2720 positioned on an interior post 2721 of the upper latch slide. The latch hooks extend through apertures 2717 in the back cover 2704 of the PED holder 2700.

The latch hooks 2718 of the quick release connector 2712 are each sized and dimensioned to slide into respective hook receiving apertures 2746 in the docking base 2600 when the PED holder 2700 is moved toward the docking base during installation. The springs 2720 bias each of the latch slides 2715 outward so that the latch hooks 2718 are in the locked position and are selectively retained by the hook receiving apertures 2746 in the docking base 2600. When the user wants to remove the PED holder 2700 from the docking base 2600, the user simply presses the buttons 2716 inward (i.e., presses the upper latch button downward and the lower latch button upward) to move the latch slides 2715, which moves the latch hooks 2718 inward and allows them to be released from the hook receiving apertures 2746 in the docking base 2600. Then, with the buttons 2716 pressed, the user may simply pull the PED holder 2700 away from the docking base 2600 to disengage the connector 2742 of the PED holder from the front connector 2734 of the docking base.

Figure 35:
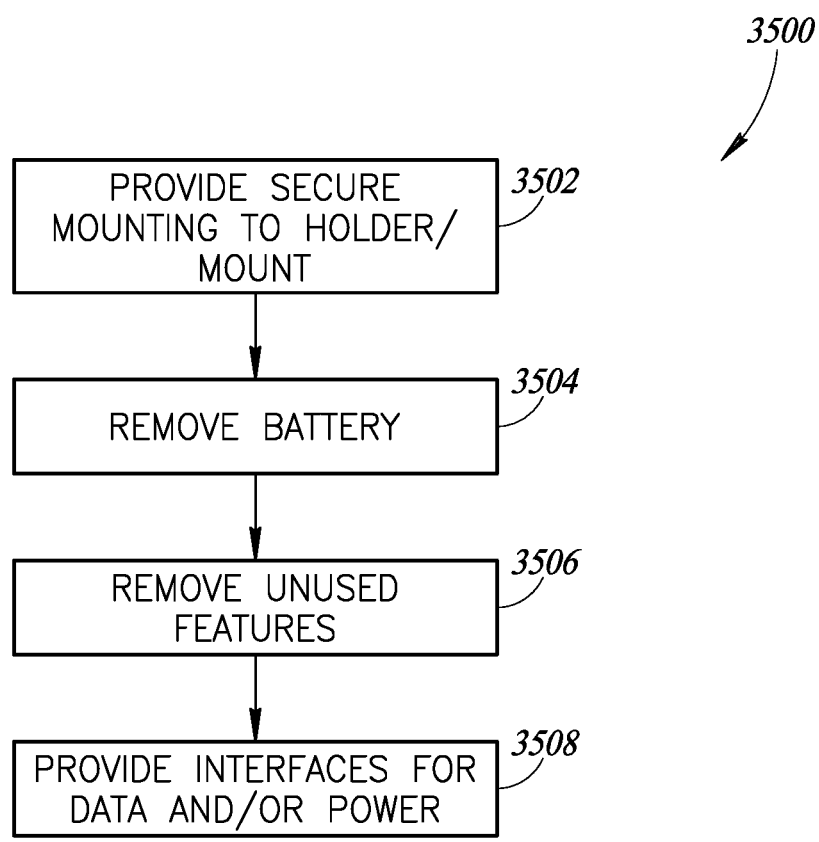
FIG. 35 is a flow diagram of a method of providing a PED for use with a wall mount system, according to one illustrated implementation.

FIG. 35 shows a flow diagram for a method 3500 of modifying a PED/display to provide a PED holder that includes an integrated display for use as part of a wall mount system, such as the wall mount systems discussed herein. At 3502, a mounting system may be provided to secure the PED/display to a PED holder (e.g., PED holder 2700) and a docking base (e.g., docking base 2600). For example, the mounting system may include a housing to support the PED/display, and a connector (e.g., quick release connector) to selectively couple the housing to a docking base. At 3504, in at least some implementations, a battery (e.g., lithium battery) of the PED/display may be removed. Among other things, this reduces the size and/or weight of the PED/display, and provides a PED/display without a battery, which may be subject to different regulations that a PED/display with a battery. At 3506, in at least some implementations, other non-used features of the PED/display may be removed. For example, such features may include speakers, mounts, etc. At 3508, one or more interfaces for power and/or data may be provided. For example, one or more interfaces may be provided in locations that optimize the overall appearance and/or usability of the PED holder. In at least some implementations, a connection is provided at the rear of the unit instead of on a side of the unit, thereby reducing the size of the PED holder and front cover or bezel.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

To the extent that they are not inconsistent with the specific teachings and definitions herein, all of the US patents, US patent application publications, US patent applications, referred to in this specification and/or listed in the Application Data Sheet, including but not limited to U.S. Patent Application Ser. No. 62/570,001, filed Oct. 9, 2017, and U.S. Patent Application Ser. No. 62/530,727, filed Jul. 10, 2017 are incorporated herein by reference in their entirety.

The invention claimed is:

1. A wall mount system for a personal entertainment device (PED), the wall mount system comprising:
   a docking base selectively attachable to a wall, the docking base comprising a docking base connector that in operation supplies at least one of power or data to a PED; and
   a PED holder comprising:
      a housing sized and dimensioned to removably receive a PED;
      a quick release connector coupled to the housing and extending outwardly from a rear side thereof, in operation the quick release connector selectively attaches to the docking base, the quick release connector comprising a release member accessible from a front side of the housing opposite the rear side of the housing when the PED is removed from the housing, the release member movable between a locked position wherein the quick release connector is secured to the docking base and an unlocked positioned wherein the quick release connector is removable from the docking base;
      a first PED holder connector that physically and electrically connects with the docking base connector of the docking base when the quick release connector is attached to the docking base; and
      a second PED holder connector electrically coupled to the first PED holder connector, in operation the second PED holder connector physically and electrically connects with a PED connector of a PED received by the housing of the PED holder.

2. The wall mount system of claim 1, further comprising:
   a cradle sized and dimensioned to receive at least a portion of the PED; and
   at least one hinge coupled between the cradle and the housing, the at least one hinge permits the cradle to pivot relative to the housing about the hinge, wherein the second PED holder connector is coupled to the cradle.

3. The wall mount system of claim 2, further comprising:
   an eject pin disposed on the front side of the housing; and
   a resilient member which biases the eject pin outwardly from the front side of the housing.

4. The wall mount system of claim 2, further comprising:
   a slide latch coupled to the front side of the housing, the slide latch movable between a locked position wherein the slide latch retains the PED in the housing and an unlocked positioned wherein the slide latch does not retain the PED in the housing.

5. The wall mount system of claim 4 wherein the slide latch is biased toward the locked position.

6. The wall mount system of claim 4 wherein the slide latch is biased toward the locked position by a slide latch spring.

7. The wall mount system of claim 1, further comprising:
   a cable electrically coupled between the first PED holder connector and the second PED holder connector.

8. The wall mount system of claim 1 wherein the quick release connector comprises:
   a latch base that includes one or more contact ball bearings, and the release member is slideable over at least a portion of the latch base between the locked position and the unlocked position, wherein in the locked position the release member exerts an inward force against the one or more contact ball bearings which causes the one or more contact ball bearings to engage corresponding detents in the docking base to retain attachment of the quick release connector to the docking base.

9. The wall mount system of claim 1 wherein the quick release connector comprises a four-sided ball latch.

10. The wall mount system of claim 1, further comprising:
   a bezel that is selectively attachable to the front side of the housing.

11. The wall mount system of claim 10 wherein the bezel is selectively attachable to the front of the housing via at least one slot hinge.

12. The wall mount system of claim 10 wherein the bezel comprises at least one latch, and the housing comprises at least one latch strike plate that in operation selectively receives the at least one latch of the bezel.

13. The wall mount system of claim 10 wherein the bezel is pivotable about a hinge coupled to the housing between a closed position wherein a rear side of the bezel is at least substantially adjacent the front side of the housing, and an open position wherein at least a portion of the rear side of the bezel is spaced apart from the front side of the housing.

14. The wall mount system of claim 13, further comprising a bezel latch assembly that selectively retains the bezel in the closed position.

15. The wall mount system of claim 14 wherein, when the bezel is in the closed position, the bezel is slideable relative to the housing between a bezel locked position wherein the bezel latch assembly retains the bezel in the closed position, and a bezel unlocked position wherein the bezel latch assembly allows the bezel to be rotated into the open position.

16. A wall mount system for selectively mounting a plurality of personal entertainment devices (PEDs), one PED mounted at a time, the wall mount system comprising:
   a docking base selectively attachable to a wall, the docking base comprising a docking base connector that in operation supplies at least one of power or data to a PED; and
   a plurality of PED holders, each PED holder comprising:
      a housing sized and dimensioned to removably receive a respective one of a plurality of PEDs, each of the plurality of PEDs differing from each other PED in at least one aspect;
      a quick release connector coupled to the housing and extending outwardly from a rear side thereof, in operation the quick release connector selectively attaches to the docking base, the quick release connector comprising a release member accessible from a front side of the housing opposite the rear side of the housing when the PED is removed from the housing, the release member movable between a locked position wherein the quick release connector is secured to the docking base and an unlocked positioned wherein the quick release connector is removable from the docking base;

a first PED holder connector that physically and electrically connects with the docking base connector of the docking base when the quick release connector is attached to the docking base; and a second PED holder connector electrically coupled to the first PED holder connector, in operation the second PED holder connector physically and electrically connects with a PED connector of a PED received by the housing of the PED holder.

17. A method of operating a wall mount system for a personal entertainment device (PED), the method comprising:

attaching a docking base to a wall, the docking base comprising a docking base connector that in operation supplies at least one of power or data to a PED;

providing a PED holder comprising:

a housing sized and dimensioned to removably receive a PED;

a quick release connector coupled to the housing and extending outwardly from a rear side thereof, in operation the quick release connector selectively attaches to the docking base, the quick release connector comprising a release member accessible from a front side of the housing opposite the rear side of the housing when the PED is removed from the housing, the release member movable between a locked position wherein the quick release connector is secured to the docking base and an unlocked positioned wherein the quick release connector is removable from the docking base;

a first PED holder connector that physically and electrically connects with the docking base connector of the docking base when the quick release connector is attached to the docking base; and a second PED holder connector electrically coupled to the first PED holder connector, in operation the second PED holder connector physically and electrically connects with a PED connector of a PED received by the housing of the PED holder;

positioning the quick release connector of the PED holder proximate the docking base;

actuating the release member of the quick release connector to attach the quick release connector to the docking base; and positioning a PED within the housing of the PED holder.

18. The method of claim 17, further comprising:

removing the PED from the housing of the PED holder;

actuating the release member of the quick release connector; and disengaging the quick release connector from the docking base.

19. The method of claim 17 wherein the housing comprises a cradle, and positioning the PED within the housing comprises positioning the PED within the cradle of the housing.

* * * * *